United States Patent
Walker et al.

(10) Patent No.: US 12,413,846 B1
(45) Date of Patent: Sep. 9, 2025

(54) MOBILE INTERFACE FOR MARKING AND ORGANIZING IMAGES

(71) Applicant: Staples, Inc., Framingham, MA (US)

(72) Inventors: M. Steven Walker, Andover, MA (US); Nathan Petersen, Andover, MA (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 18/444,420

(22) Filed: Feb. 16, 2024

Related U.S. Application Data

(63) Continuation of application No. 17/646,842, filed on Jan. 3, 2022, now Pat. No. 11,910,082, which is a continuation of application No. 16/601,550, filed on Oct. 14, 2019, now Pat. No. 11,218,639.

(60) Provisional application No. 62/744,844, filed on Oct. 12, 2018.

(51) Int. Cl.
  *H04N 23/63* (2023.01)
  *G06V 20/20* (2022.01)

(52) U.S. Cl.
  CPC .......... *H04N 23/632* (2023.01); *G06V 20/20* (2022.01); *H04N 23/633* (2023.01); *H04N 23/635* (2023.01)

(58) Field of Classification Search
  CPC .. H04N 23/632; H04N 23/633; H04N 23/635; G06V 20/20
  See application file for complete search history.

(56) References Cited

U.S. PATENT DOCUMENTS

| | | | |
|---|---|---|---|
| 6,683,649 B1 * | 1/2004 | Anderson | H04N 1/00416 386/E5.072 |
| 8,432,414 B2 | 4/2013 | Vetterli et al. | |
| 9,117,483 B2 | 8/2015 | Zaletel | |
| 9,583,074 B2 | 2/2017 | Chau | |
| 10,783,684 B2 | 9/2020 | Wu et al. | |
| 11,218,639 B1 * | 1/2022 | Walker | H04N 23/633 |
| 11,910,082 B1 * | 2/2024 | Walker | H04N 23/632 |

(Continued)

OTHER PUBLICATIONS

Evernote, Wikipedia, https://en.wikipedia.org/wiki/Evernote, Oct. 3, 2019, 11 pgs.

(Continued)

*Primary Examiner* — Abdelaaziz Tissire
(74) *Attorney, Agent, or Firm* — VLP Law Group LLP; Michel Bohn

(57) ABSTRACT

A system and method for providing a mobile interface for marking and organizing images is described herein. In some instances, the system may present, on a display device, an image region that displays a capturable image that is capturable by an image sensor of the wireless mobile electronic device and a preview region including a series of one or more annotatable image previews. The system may receive an input instructing the wireless mobile electronic device to capture a second image using the image sensor of the wireless mobile electronic device, generate a second image preview representing the second image, and update the graphical user interface to include the second image preview at the preview region. The system may receive an input including an annotation using an input device of the wireless mobile electronic device and update the graphical user interface to represent the annotation at the preview region.

20 Claims, 31 Drawing Sheets

(56) References Cited

U.S. PATENT DOCUMENTS

| | | |
|---|---|---|
| 2005/0257137 A1 | 11/2005 | Weber et al. |
| 2007/0236583 A1* | 10/2007 | Vuong .................... G06F 16/58 |
| | | 707/E17.026 |
| 2008/0268876 A1 | 10/2008 | Gelfand et al. |
| 2009/0319178 A1 | 12/2009 | Khosravy et al. |
| 2011/0164163 A1 | 7/2011 | Bilbrey et al. |
| 2013/0076963 A1* | 3/2013 | Sirpal .................... G06F 1/1692 |
| | | 348/333.01 |
| 2013/0222612 A1 | 8/2013 | Sako et al. |
| 2013/0222616 A1 | 8/2013 | Mendis |
| 2014/0125856 A1* | 5/2014 | Kim .................... H04N 1/00411 |
| | | 348/333.02 |
| 2015/0356063 A1 | 12/2015 | Jiang et al. |
| 2016/0240011 A1 | 8/2016 | Fedosov et al. |
| 2017/0046877 A1* | 2/2017 | Hustad .................... G06F 3/011 |
| 2018/0143756 A1 | 5/2018 | Mildrew et al. |
| 2018/0165738 A1 | 6/2018 | Chilukuri et al. |
| 2018/0349008 A1* | 12/2018 | Manzari ............... H04N 23/667 |
| 2019/0174070 A1 | 6/2019 | Jang |
| 2020/0159387 A1 | 5/2020 | Schoenfelder et al. |

OTHER PUBLICATIONS

Microsoft PowerPoint, Wikipedia, https://en.wikipedia.org/wiki/Microsoft_PowerPoint, Oct. 13, 2019, 50 pgs.

* cited by examiner

MOBILE INTERFACE FOR MARKING AND ORGANIZING IMAGES

BACKGROUND

The present specification generally relates to providing an improved graphical interface for organizing and documenting a walk-through of an environment.

Individuals in various industries perform tours of facilities in which they assess the products and services used in those facilities. Currently, the individuals spend multiple hours traveling around a building or campus taking photos and videos of many facets of buildings, products used in buildings, etc. For example, an individual may take photos of supplies, such as towel racks, soap dispensers, faucets, cleaning supplies, etc., in bathrooms or other areas of a building. The individuals may alternatively take physical notes on paper.

Typically, the individuals spend substantial amounts of time going back through the photos, videos, and notes at a later time. For instance, an individual may later review the images and notes, determining which notes match which images, as well as, in some instances, taking additional notes on a physical notebook.

Some applications for taking notes on computers exist, but they are not optimized for small displays, such as are present on smart phones or tablets, are not optimized for real-time annotation and mobility, and do not automatically or easily organize or link various types of notes with images, for example.

Taking photos, notes, etc., and creating presentations using these traditional methods consumes massive amounts of time, display size, and computing resources.

SUMMARY

According to one innovative aspect of the subject matter described in this disclosure, a system may include one or more processors and non-transitory memories that may perform a method. In some implementations, the computer-implemented method may include presenting, by a processor, on a display device of a wireless mobile electronic device, a graphical user interface including: an image region that displays a capturable image that is capturable by an image sensor of the wireless mobile electronic device, and a preview region including a series of one or more annotatable image previews, a first image preview of the one or more annotatable image previews representing a first image in the series; receiving, by the processor, an input instructing the wireless mobile electronic device to capture a second image using the image sensor of the wireless mobile electronic device; generating, by the processor, a second image preview representing the second image; updating, by the processor, the graphical user interface to include the second image preview at the preview region; receiving, by the processor, an input using an input device of the wireless mobile electronic device, the input including an annotation; and updating, by the processor, the graphical user interface to represent the annotation at the preview region.

Implementations may include one or more of the following features. The computer-implemented method where updating the graphical user interface to represent the annotation at the preview region includes: updating the second image preview at the preview region to include a graphical indicator representing the annotation. The computer-implemented method where: generating the second image preview representing the second image includes generating a thumbnail image representing the second image, and updating the second image preview at the preview region includes overlaying the graphical indicator over the thumbnail image. The computer-implemented method where updating the second image preview at the preview region includes determining a type of the annotation, and generating the graphical indicator based on the type of the annotation. The computer-implemented method where updating the graphical user interface to represent the annotation at the preview region includes: generating an annotation preview representing the annotation, and updating the graphical user interface to represent the annotation preview inserted into the series of one or more annotatable image previews in the preview region. The computer-implemented method where: updating the graphical user interface to include the second image preview at the preview region includes inserting the second image preview, by the processor, into the series of one or more annotatable image previews based on a time at which the second image was captured, and updating the graphical user interface to represent the annotation preview includes inserting, by the processor, the annotation preview into the series of one or more annotatable image previews based on a time at which the annotation was received. The computer-implemented method further including: receiving, by the processor, an input using the input device of the wireless mobile electronic device, the input including a second annotation; determining, by the processor, that the second annotation is associated with the second image; and modifying, by the processor, the second image preview in the preview region to include a second graphical indicator representing the second annotation. The computer-implemented method further including: receiving, by the processor, an input using the input device instructing the processor to expand the series of one or more annotatable image previews; and increasing, by the processor, a relative size of the series of one or more annotatable image previews within the graphical user interface, the series of one or more annotatable image previews being horizontally scrollable within the graphical user interface. The computer-implemented method where the graphical user interface further includes a graphical menu overlaid over the image region, the graphical menu including a set of graphical menu elements displayed radially around a central point in the graphical user interface, each of the set of graphical menu elements representing a type of annotation. The computer-implemented method where the annotation includes one or more of an audio file, a drawing on the second image, a tag corresponding to the second image, and a textual comment.

Another general aspect includes a computer-implemented method including: presenting, by a processor, on a display device of a mobile electronic device, a graphical user interface including a preview region displaying a first image preview representing a first image; receiving, by the processor, an input instructing the mobile electronic device to capture a second image using an image sensor of the mobile electronic device; generating, by the processor, a second image preview representing the second image; updating, by the processor, the graphical user interface to include the second image preview at the preview region; receiving, by the processor, an input using an input device of the mobile electronic device, the input including an annotation; and updating, by the processor, the graphical user interface to represent the annotation at the preview region.

The features and advantages described herein are not all-inclusive and many additional features and advantages will be apparent to one or ordinary skill in the art in view of the figures and description. Moreover, it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
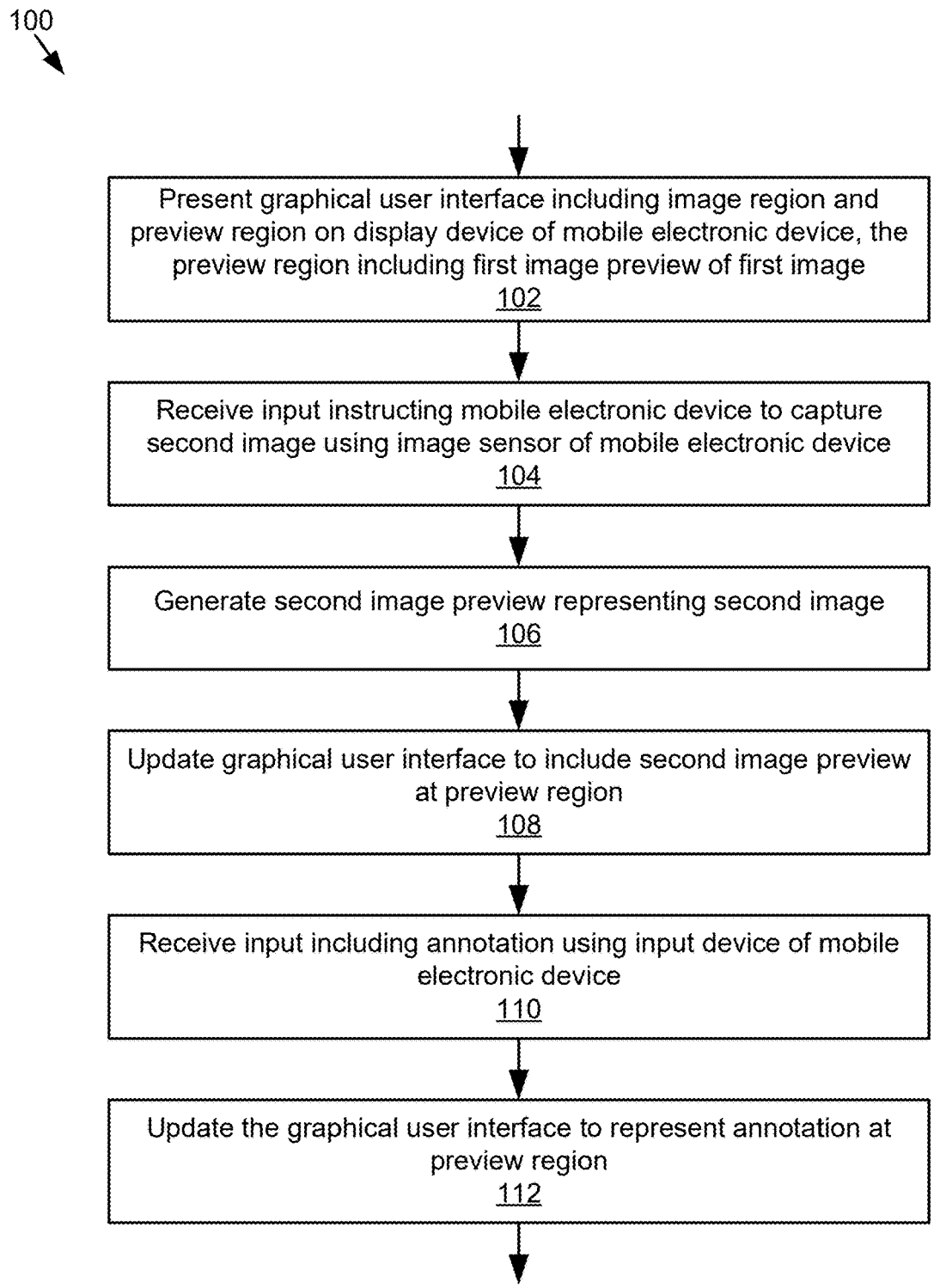
FIG. 1 is a flowchart of an example method for providing a mobile graphical user interface for marking and organizing images.

The disclosure is illustrated by way of example, and not by way of limitation in the figures of the accompanying drawings in which like reference numerals are used to refer to similar elements. The technology disclosed herein includes computing systems, methods, user interfaces, data, and other aspects that provide the operations and interfaces described herein, as described in further detail below.

The present specification generally relates to providing an improved graphical interface for organizing and documenting a walk-through of an environment, with enhanced features that allow photos and videos to be captured while seamlessly tagging or associating them with flags, text notes, or voice memos. This technology may later allow the information from the walk-through to be easily accessible for building presentations, preparing emails, or connecting critical information from the information to any number of people, parties, or files.

The technology described herein may include a timeline application 408 that creates an organized set of images, notes, audio clips, and/or other information that maps images, text, voice, images, flags, locations, or other data together, for instance, in a timeline or series of documents. For example, a user may use the application to take a photo of an item, record an audio note pertaining to the item, and flag the photo with markers describing its subject matter. In some instances, the audio note may be automatically transcribed and linked with the photo.

It should be noted that this description may use the term timeline to indicate a series or set of documents (e.g., files, annotations, images, etc.), which, in some implementations, may be automatically linked or organized based on a time at which they are added to the set. In some implementations, the documents may be manually or automatically added to the set of documents in an order other than chronologically.

It should be noted that the terms image, photo, and photograph are used interchangeably herein. Further, the terms note and annotations are used interchangeably herein.

In some instances, the timeline application 408 may transmit files including the organized set of data, for example, including the photo(s) and associated notes to a presentation application, note taking application on a computer, or a computing device of another user, such as a facilities manager, sales representative, engineer, etc. For instance, the timeline application 408 may generate a presentation of the data based on organization and linking data. For instance, the timeline application 408 may generate a presentation as a movie or slideshow presentation including images, notes, audio, etc. The file, presentation, images, notes, etc., may be automatically archived for future use by the user or shared with other users.

In some implementations, the timeline application 408 may automatically sync the photos, annotations, and other data with one or more applications on a remote server thereby allowing access by another instance of the timeline application 408 or a web interface on a browser, for example.

In some implementations, the timeline application 408 may automatically sort images and associated data based on flags, categories, groups, spaces, notes, etc., described herein to facilitate (and/or automatically perform) counting and identification of items in the images and/or determination of associated data. For example, the photos and associated notes can be used to perform an audit of a facility to determine which products are being used, how many products are being used, whether products are being used correctly, whether there are any hazards, quantities items to be replaced, etc.

In some implementations, the timeline application 408 may use flags, tags, categories, groups, spaces, assessment levels, notes, etc., to organize associated photos, for example, to provide a virtual tour or presentation of the facility. In some instances, photos and notes of future visits to the facility can be combined with past timelines of photos and notes to augment the timelines. Accordingly, visits to the facility can be shortened or eliminated. Further, the ability to map notes, flags, photos, etc., in a timeline improves the accuracy and information recall from the notes.

For the purposes of this disclosure, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a flowchart of an example method 100 for providing a mobile graphical user interface for marking and organizing images.

At 102, the timeline application 408 may present a graphical user interface including an image region and a preview region on a display device of a client device 406 (e.g., a wireless mobile electronic device). In some instances, the preview region may include a first image preview of first image.

Figure 2:
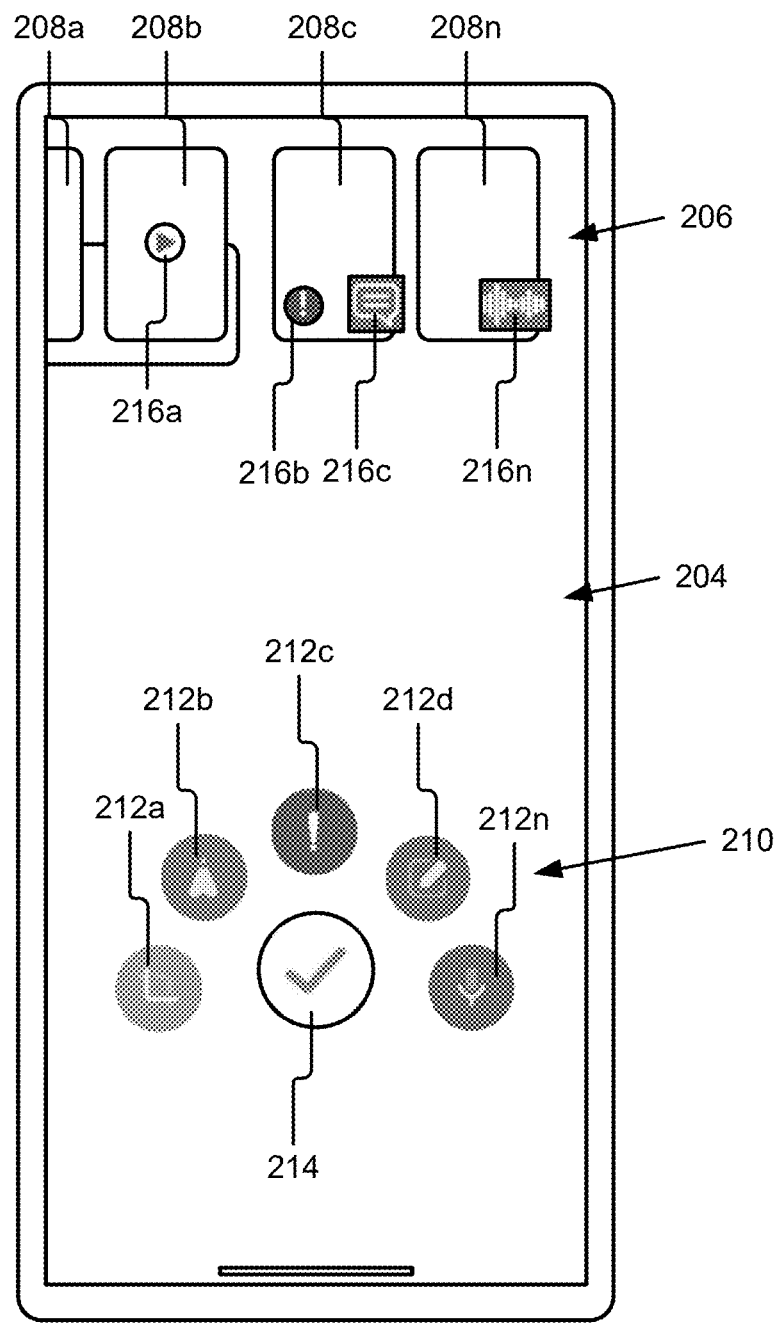
FIG. 2 is an illustration of an example mobile graphical user interface for marking and organizing images.

For example, an example graphical user interface (GUI) with an image region 204 and a preview region 206 is illustrated in FIG. 2. In some implementations, the image region 204 may display a capturable image that is capturable by an image sensor of the client device 406. In some instances, the image region 204 may display a viewfinder and/or a captured image, as illustrated and described in further detail below. In some implementations, the preview region 206 may include a series of one or more annotatable image previews 208*a* . . . 208*n*. For instance, a first image preview 208*b* of the one or more annotatable image previews 208 may represent a first image in the series.

Referring to FIG. 1, at 104, the timeline application 408 may receive one or more inputs instructing the client device 406 to capture a second image using an image sensor of the client device 406. For instance, as described in further detail below, the timeline application 408 may communicate with a camera of a client device 406 to capture a photograph/image and/or may receive an image file, for example, from a file system of the client device 406. In some instances, the image region may display the captured or capturable image.

At 106, the timeline application 408 may generate a second image preview representing the second image. For example, generating the second image preview representing the second image may include generating a thumbnail image representing the second image. In some instances, an image preview may be lower resolution or smaller than the original image.

At 108, the timeline application 408 may update the GUI to include the second image preview at the preview region. In some implementations, updating the GUI to include the second image preview at the preview region may include inserting the second image preview into the series of one or more annotatable image previews based on a time at which the second image was captured. It should be noted that the second image preview may be inserted into the series at a point other than in chronological order with other previews in the preview region.

For example, the preview region 206 illustrated in FIG. 2 includes a series of annotatable image previews 208. In an example where a first image preview 208*b* is already in the set of image previews 208, the second image preview (e.g., 208*c*) may be inserted into the series.

Referring to FIG. 1, at 110, the timeline application 408 may receive one or more inputs including an annotation using an input device of the client device 406. In some implementations, the input may include an annotation or an instruction to receive an annotation, for example, the annotation may include one or more of an audio or video recording, a drawing on the image, a flag or tag on the image, a textual comment, or a tag specifying one or more attributes of the image or an object shown in the image, as described in further detail below.

For example, the timeline application 408 may display a graphical menu 210 in the graphical interface, which may be overlaid, for example, over the image region 204. The graphical menu 210 may allow a user to input or upload various types of annotations to the series of annotatable image previews and/or to a given image preview, for example, as described in further detail to FIGS. 3A and 3B. For instance, the graphical menu 210 may have a set of graphical menu elements 212*a* . . . 212*n*, one or more of which may be selected to add various type of annotations or otherwise interact with the image or series of images.

Referring to FIG. 1, at 112, the timeline application 408 may update the GUI to represent the annotation at the preview region.

In some implementations, the timeline application 408 may generate a graphical indicator representing the annotation (also referred to as an annotation preview) and may update the GUI to insert the annotation preview into the series in the preview region. For instance, the timeline application 408 may insert the annotation preview into the series of one or more annotatable image previews based on a time at which the annotation was received. The timeline application 408 may determine a timestamp of the annotation relative to other documents in the series and insert the annotation chronologically. For example, the annotation preview may be inserted into the series unassociated with an image, although, in some instances, it may be associated with an image, as described below.

In some implementations, the timeline application 408 may generate a graphical indicator representing the annotation and update the second image preview at the preview region to include the graphical indicator. For example, the timeline application 408 may overlay the graphical indicator over the image preview of the captured image (e.g., the second image). In some implementations, the timeline application 408 may determine a type of the annotation (e.g., text comment, audio recording, tag, etc., as described above) and generate the graphical indicator based on the type of the annotation, so that the graphical indicator indicates the type of annotation. For example, examples of graphical indicators 216 are illustrated in the preview region 206 in FIG. 2.

It should be noted that, although only a single instance of adding an image and annotation to the timeline is described in reference to FIG. 1, one or more second images and/or annotations may be added by repeating the operations of the method 100.

FIG. 2 is an illustration of an example mobile GUI for marking and organizing images. As illustrated, the example mobile GUI may include an image region 204 and a preview region 206. As described above, the image region 204 may include an image and/or viewfinder and the preview region 206 may include one or more previews 208.

In some implementations, the GUI may include a graphical menu 210 overlaid over the image region 204. The graphical menu 210 may include a set of graphical menu elements 212*a* . . . 212*n* displayed radially around a central point (or central menu element 214) in the GUI. For instance, each of the graphical menu elements 212 may represent a type of annotation. For example, as illustrated, the element 212*a* may allow an image to be cropped; the element 212*b* may allow a user to draw (e.g., on an image); the element 212*c* may receive one or more alerts, flags, or tags as an annotation; the element 212*d* may receive a textual comment as an annotation; and the element 212*n* may receive an audio recording as an annotation. In some implementations, the central menu element 214 may be selectable to confirm addition of an image or annotation and/or return to another graphical interface (e.g., for capturing another image or annotation).

In some implementations, the GUI of FIG. 2 may be displayed when a photograph is captured or added to a set of images in the preview region 206 (which may represent a timeline). For example, when a user takes a photo, the timeline application 408 may create a timeline or the photo may be added to a timeline. In some implementations, the timeline may be displayed as a series of images (e.g., thumbnails) overlaid along the top of a display in a preview region 206. The timeline application 408 may hide the preview region 206 when not in use and the preview region 206 may be displayed based on user interaction (e.g., swiping down from a top of a display on a client device 406) thereby optimizing use of a small size display, for example, on a mobile electronic user device. Some or all of the image previews or annotations, etc., in a timeline may be visible in the preview region 206 and, in some instances, the preview images may be enlarged, moved on the display, or scrolled (e.g., horizontally) to display more images. For instance, a user may swipe down or select a given graphical element at the top or another portion of the interface, thereby causing the preview region 206 to slide down into view, for example, by overlaying the preview region 206 over the image region 204.

In some implementations, as each image, note (e.g., unlinked from an image), etc., is taken, the timeline application 408 may add it to a timeline (e.g., to the right of the previous image). The timeline, building of the timeline, and its other features are described in further detail below.

In some implementations, the timeline application 408 may augment one or more of the GUIs described herein based on certain actions performed using the client device 406 on which the application may be executed. For instance, when a client device 406 is rotated 90 degrees, the mode of the timeline application 408 may change. For instance, rotating the client device 406 while annotating photographs, interacting with the graphical menu 210, viewing the timeline (e.g., in the preview region 206, etc.), or performing other operations may change a mode or operation of the timeline application 408. For example, when the client device 406 is rotated, the preview region 206 may be automatically displayed or enlarged.

In some implementations, the preview region 206 may include one or more graphical indicators 216a . . . 216n that represent annotations inserted into the series of previews/timeline, or the graphical indicators 216 may be associated with one or more image previews/images. For example, each graphical indicator 216 may represent a different type of annotation. For instance, the example graphical indicator 216a may represent a video; the example graphical indicator 216b may represent an alert, flag, or type of tag; the example graphical indicator 216c may represent a text comment; and the example graphical indicator 216n may represent an audio recording.

In some implementations, the preview region 206 may include a group indicator 218 indicating that one or more images and/or annotations are associated or grouped, as described in further detail below.

Figure 3A:
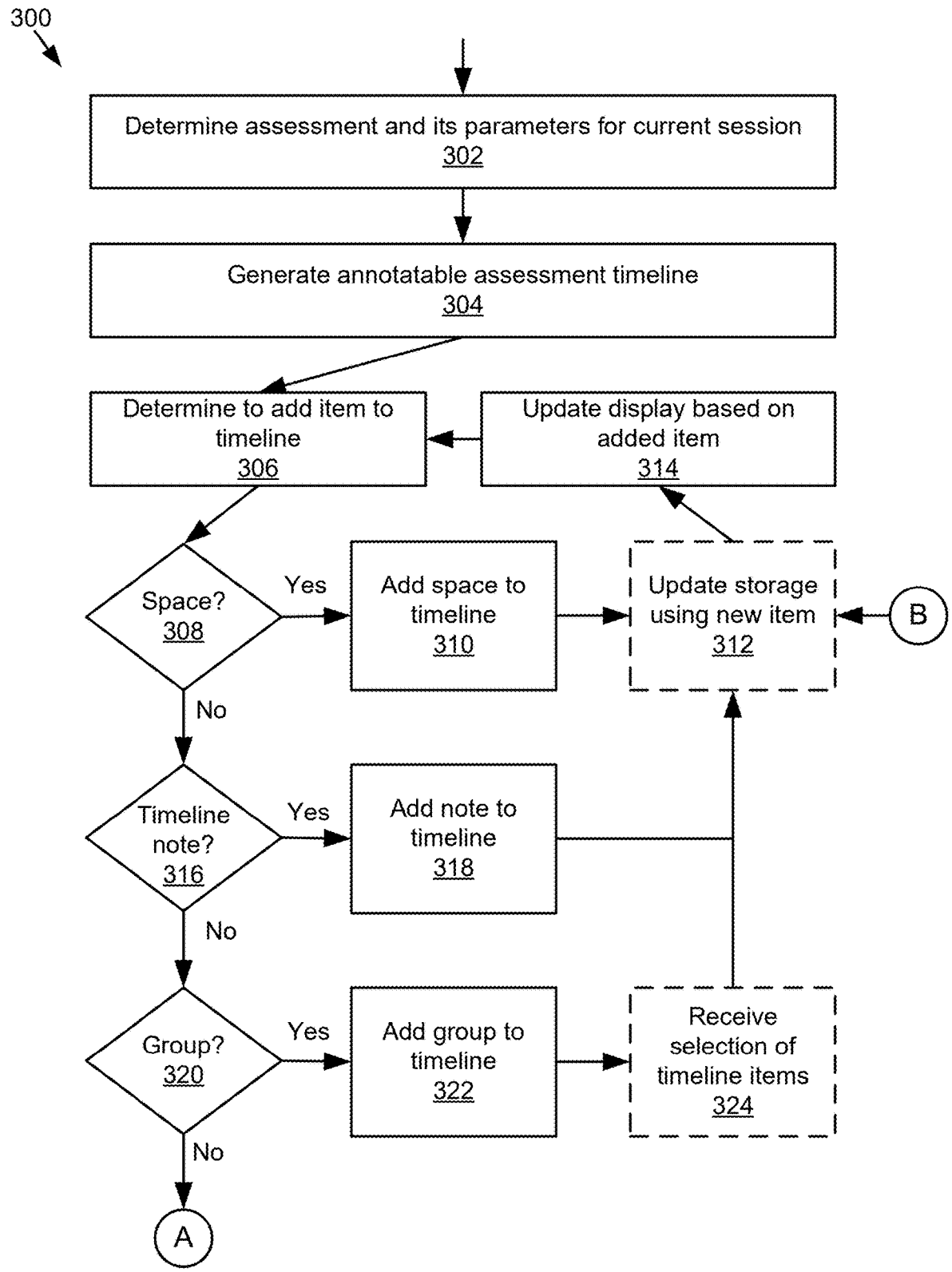
FIGS. 3A-3B are flowcharts of an example method for providing a mobile graphical user interface for marking and organizing images.
Figure 3B:
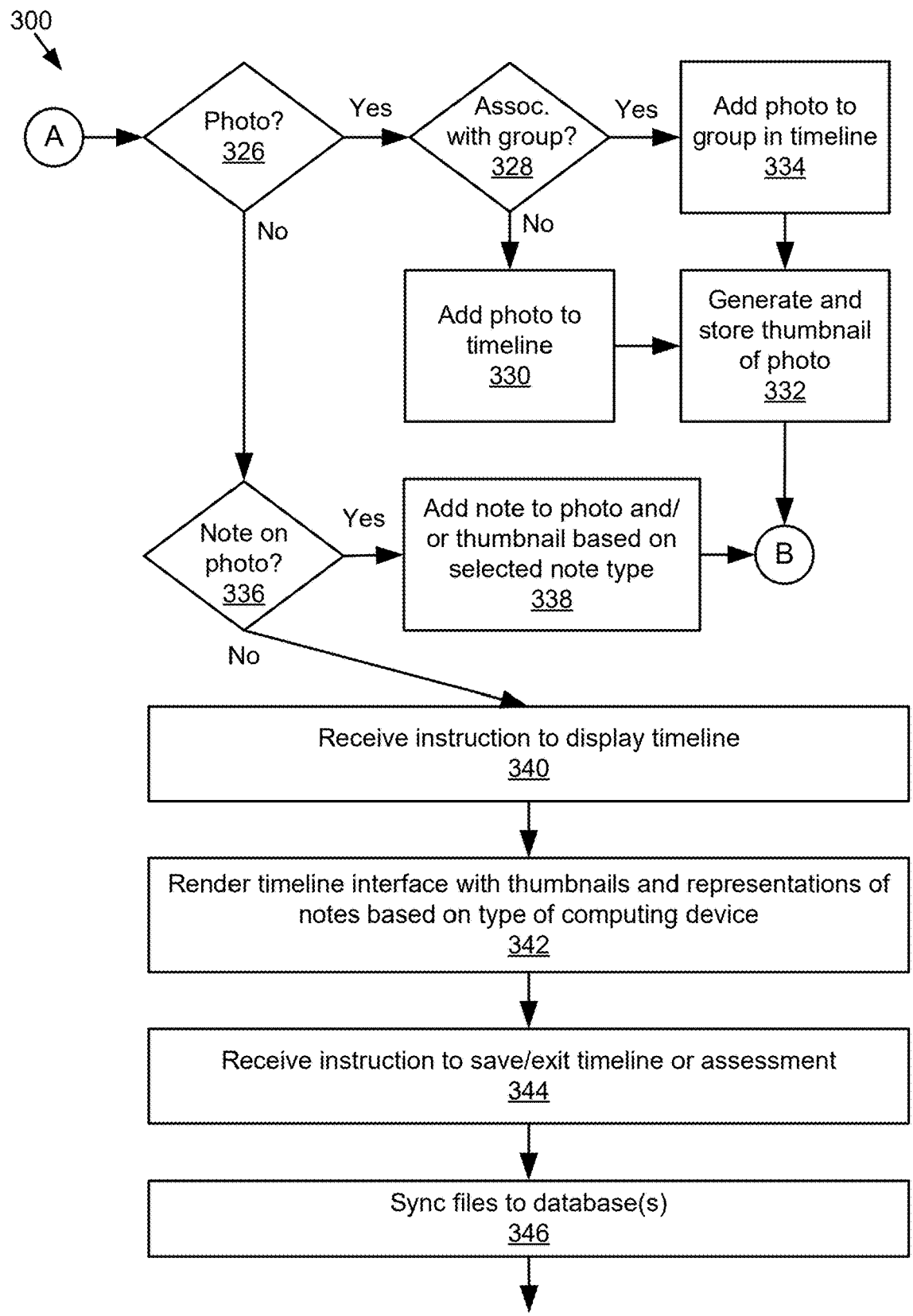

FIG. 3A and FIG. 3B are flowcharts of an example method 300 for providing a mobile GUI for marking and organizing images. In some implementations, the operations of the method 300 provide additional or alternative features to those described in reference to FIG. 1. Similarly, the GUIs described in reference to the method 300 may provide additional or alternative features to those described above, for example, in reference to FIG. 2. It should be further noted that the GUIs, elements, features, and interactions described herein (e.g., in reference to FIGS. 6-52) are provided by way of example and that they may be altered, rearranged, removed, or augmented without departing from the scope of this disclosure.

At 302, the timeline application 408 may determine an assessment and its parameters for a current session. An assessment may include one or more timelines or organized sets of images and annotations. The timeline application 408 may determine whether to continue a previous assessment or start a new assessment, for example, based on the existence of a previous assessment and/or a user input. In some implementations, when the timeline application 408 is opened on a mobile client device 406, it may query a note server 422 to determine whether any previous assessments have been started. For example, in some implementations, photos of an assessment may be retrieved from a first data store (e.g., the photo storage 426) and annotations or other data associated with (e.g., pointing to, etc.) the photos may be retrieved from a second data store (e.g., a database 428, which may be a SQL or structured query language database).

FIGS. 6-10 describe example GUIs for determining an assessment and its parameters. For example, in FIG. 6 a previous assessment region 602 may represent one or more assessments if they exist in accessible computer storage (e.g., whether locally or on a remote server). In some implementations, the timeline application 408 may provide a login element 604 that may be selected to log in to an account via the timeline application 408. The timeline application 408 may provide an add assessment element 606 which may be selected to start a new assessment.

Figure 7:
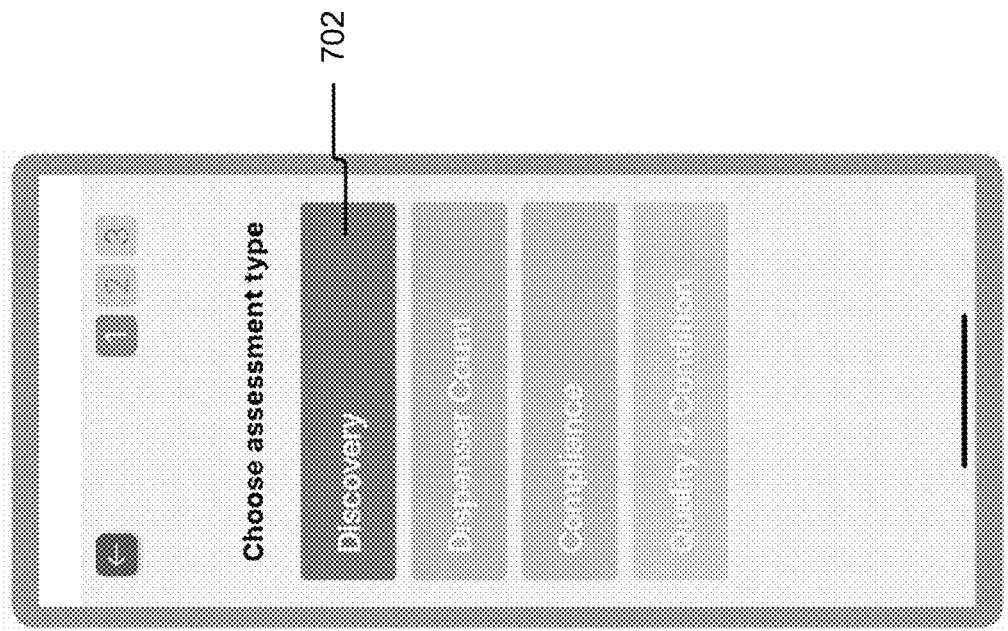
FIGS. 6-49 are illustrations of example mobile graphical user interfaces for marking and organizing images.
Figure 6:
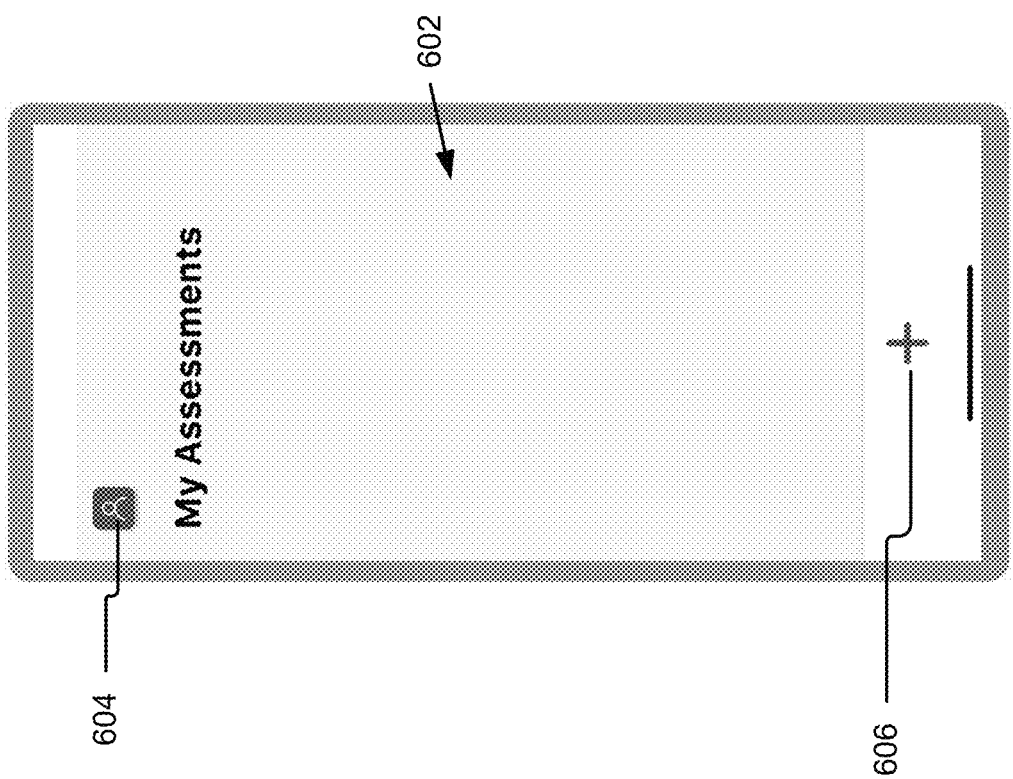

In some implementations, for example when the add assessment element 606 is selected, the timeline application 408 may provide the example GUI illustrated in FIG. 7 where a user may select a type or function 702 of the assessment. For instance, an assessment type may be associated with one or more timelines.

Figure 8:
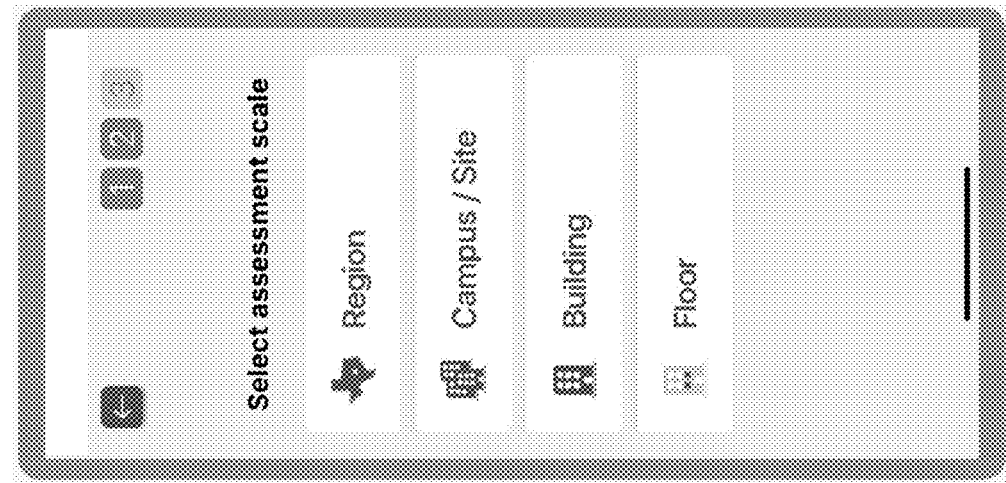

In some implementations, the timeline application 408 may display the example GUI illustrated in FIG. 8 where an assessment scale may be selected. In some implementations, the selection of an assessment scale may flag the assessment with a label representing the scale. In some implementations, the selection of a higher-level assessment scale may allow sub-assessments to be selected and added to the assessment at a later point or may modify the space or group options (e.g., levels) provided by the timeline application 408, for example, as described below.

Figure 9:
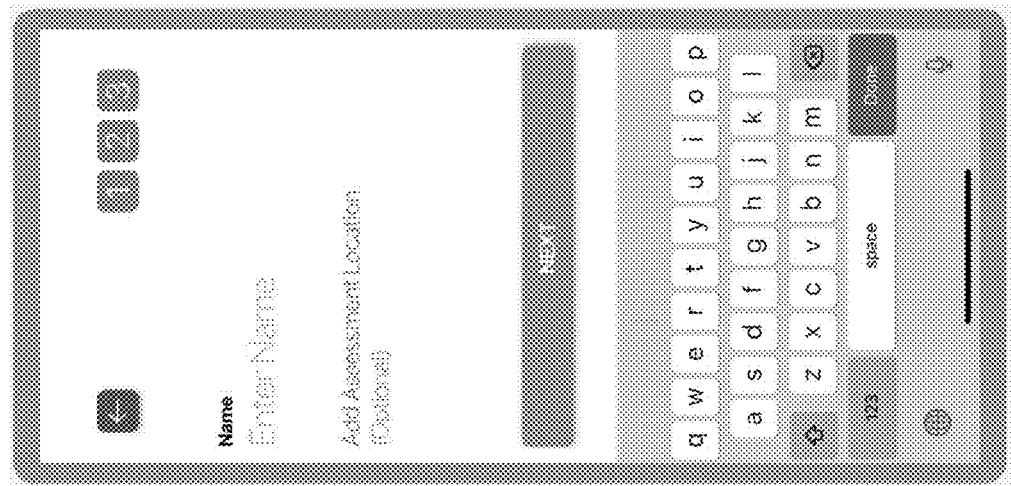

In some implementations, the timeline application 408 may provide the GUI illustrated in FIG. 9 and at which a name or label for the assessment may be received and associated with the assessment. In some instances, the timeline application 408 may automatically add a name based on the assessment type, scale, or location.

Figures 10, 11:
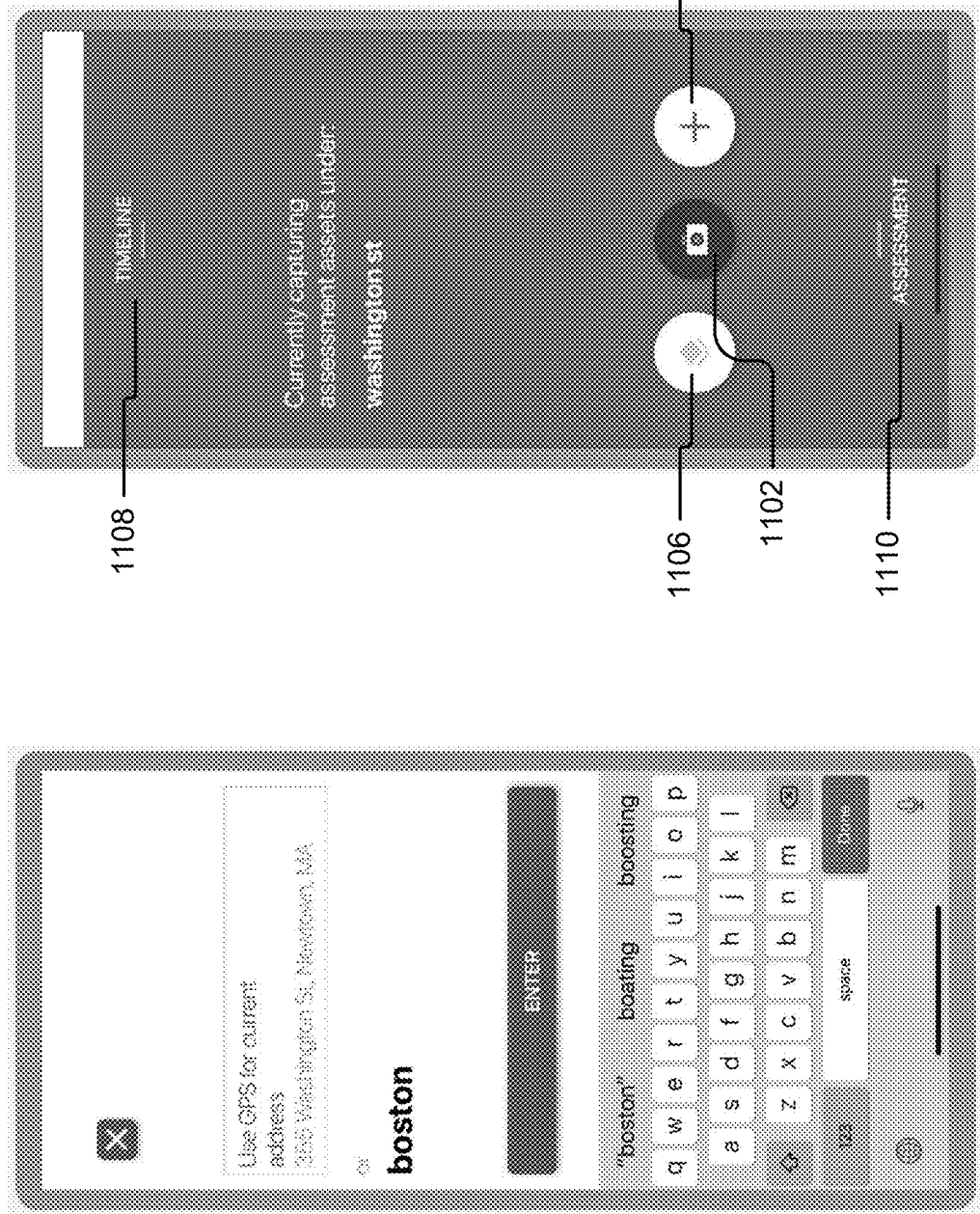

In some implementations, the timeline application 408 may display the GUI illustrated in FIG. 10 at which a location may be added to the assessment and/or timeline, space, scale, etc. In some implementations, the timeline application 408 may communicate with a location service of the client device 406 (e.g., using GPS, Wi-Fi, or cell-tower data) to determine the location of the client device 406 and may suggest the determined location as the location. In some instances, the location may be manually added. In some instances, the location may be used as the name of the assessment, timeline, etc.

Referring to FIG. 3A, at 304, the timeline application 408 may generate an annotatable assessment timeline. As described above, a timeline may be an organized set of documents which may or may not have a chronological or nearly chronological order. In some implementations, generating a timeline may include using one or more of the GUIs described in reference to FIGS. 6-10 above, although other implementations are possible and contemplated herein. For instance, the timeline may provide an organization or structure by which information, such as notes, audio data, locations, flags, categories, etc., may be linked to photos by embedding the information in metadata of the photo, modifying the photo, linking the data together in a table, array, document, etc., although other implementations are possible and contemplated herein.

Figure 15:
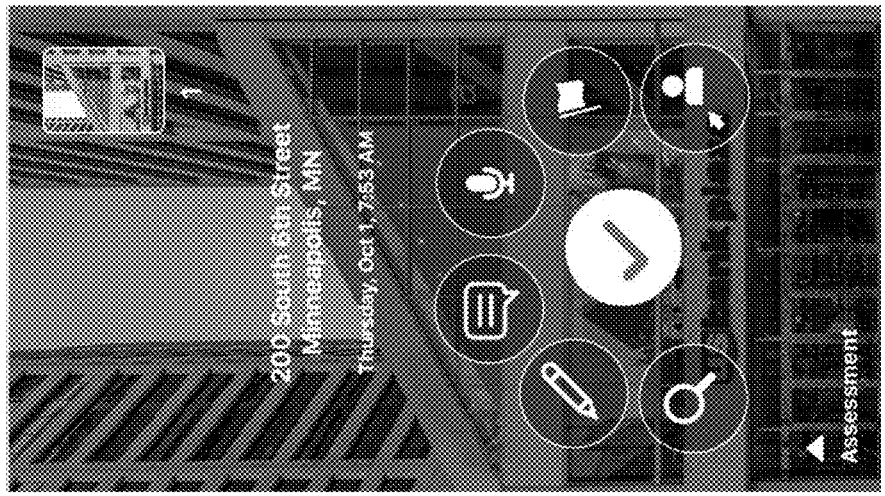
Figure 14:
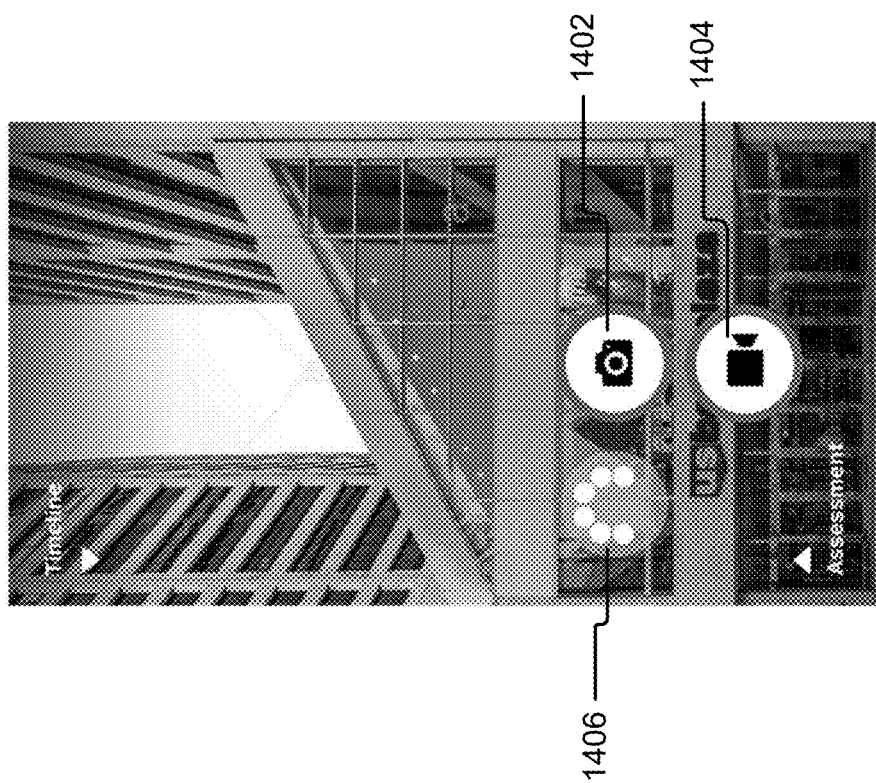

In some implementations, when starting a timeline, a user may start by selecting a graphical element representing an option provided by the timeline application 408 to add a photo, video, or note. For example, the timeline application 408 may capture an image of the exterior of a facility (e.g., as illustrated in FIGS. 14-15) to serve as a cover image and allow the user to easily recognize the facility that is the subject of the timeline. In some implementations, the timeline application 408 may automatically associate a location (e.g., using GPS data received from a GPS sensor of the client device 406 on which the application is being executed) with the first (and/or any subsequent) photo in the timeline. For example, as illustrated in FIG. 15, a geographical location may be overlaid or otherwise mapped to the first photo to indicate where the photo and/or timeline were captured.

At 306, the timeline application 408 may determine to add an item to the timeline. The timeline application 408 may receive a photograph, note, new space, new group, or other item, as described in further detail below.

Figure 16:
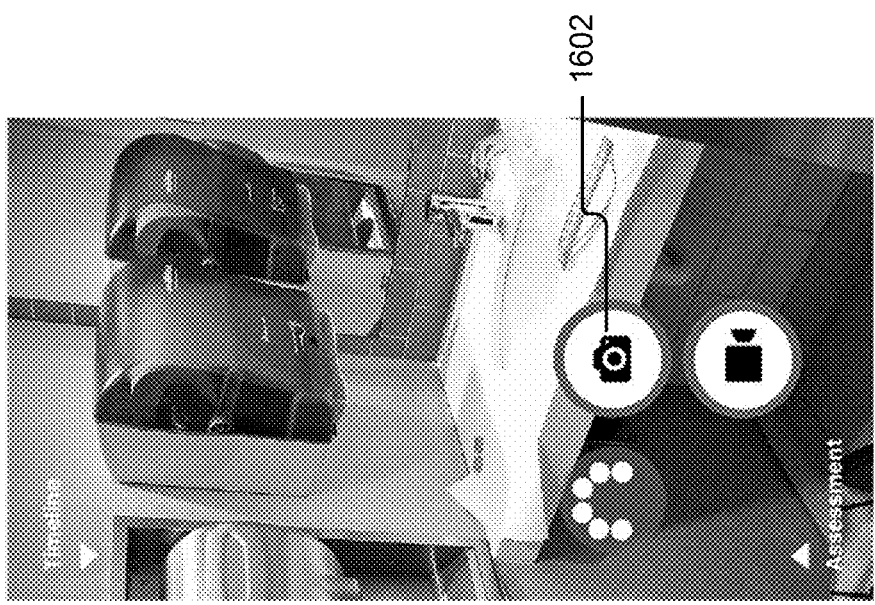

For example, as illustrated in reference to FIG. 11, the timeline application 408 may display a GUI including a center button 1102 for capturing images/photographs. Other configurations of the GUI illustrated in FIG. 11 are shown in FIGS. 14 and 16, for example.

Figure 13:
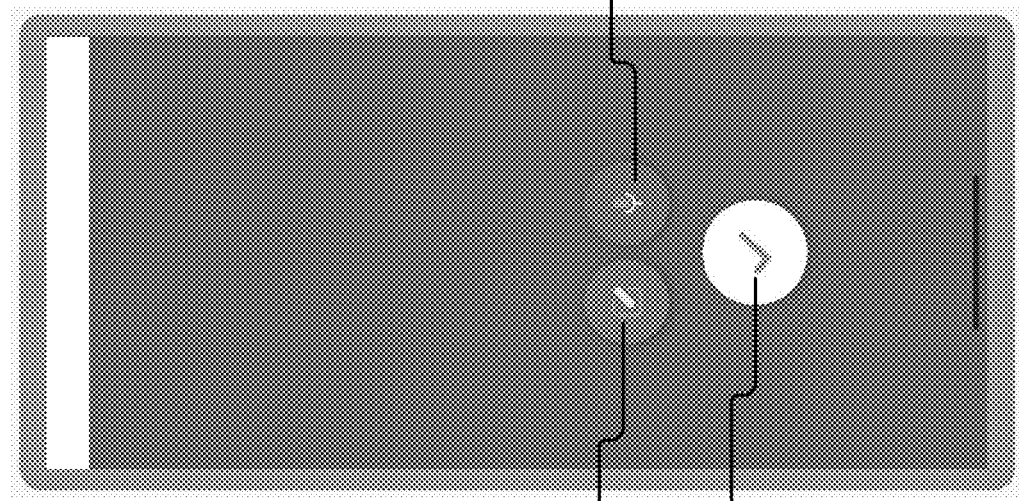
Figure 17:
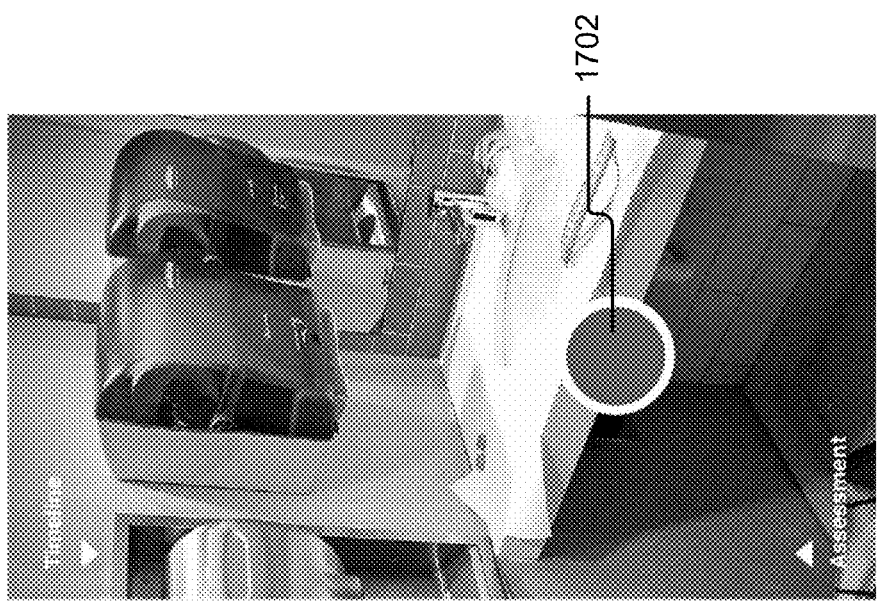

The center button 1102 may be held down to capture a video and/or audio recording, depending on the implementation. The center button 1102, when selected, may cause the timeline application 408 to display a photo capture interface, file manager, or viewfinder, for example, as illustrated in FIG. 13, 15, or 17, etc., for receiving an image.

In some implementations, the GUI may also include a note taking element 1104 that may be selected to add one or more annotations (e.g., audio, text, etc.) directly to the timeline (e.g., associated with a point in the series of documents or previews in the timeline rather than a specific image). For instance, the note taking element 1104 may display an interface, such as is described in reference to FIGS. 13, 15, or other figures, which may be used to add annotations. In some implementations, selection of the note taking element 1104 may cause the graphical menu, such as illustrated in FIG. 2, 15, 18, or 39, for example, to be displayed.

In some implementations, the GUI illustrated in FIG. 11 may include a grouping button 1106, which may be toggled to initiate or terminate a grouping of images and/or annotations. For instance, when the grouping button 1106 is toggled on, the following images or annotations may be added to the group. In some implementations, in response to toggling the grouping button 1106 on or off the timeline application 408 may automatically display one or more of the interfaces illustrated in FIGS. 28-30.

Figure 12:
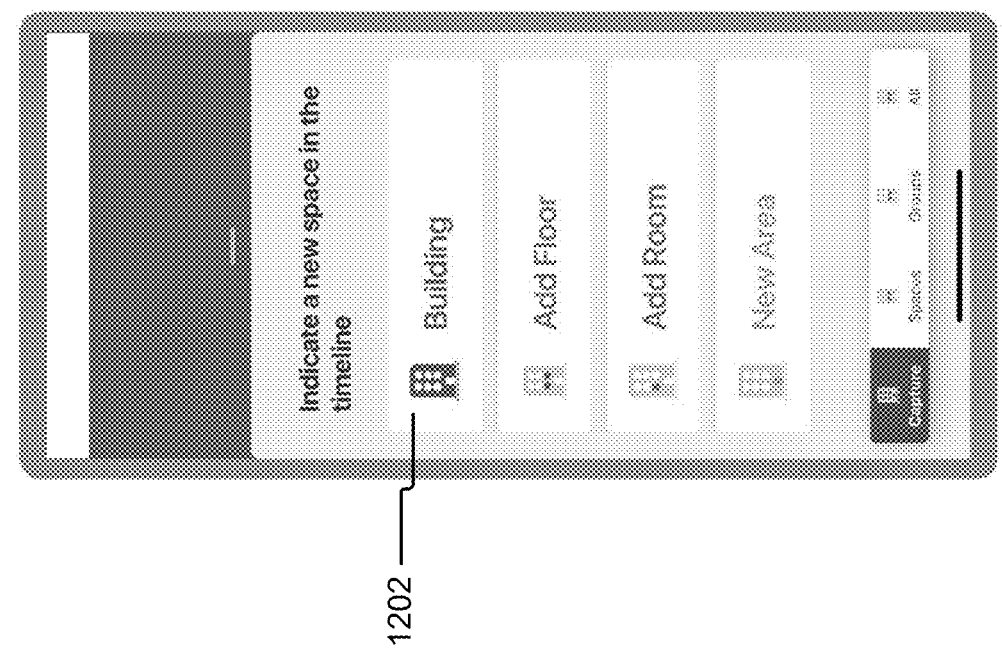

In some implementations, the GUI illustrated in FIG. 11 may also include a timeline element 1108 that may be pulled down or selected to display a timeline in a preview region, as described elsewhere herein. In some implementations, the GUI may include an assessment element 1110, which, when pulled up or selected may cause the timeline application 408 to display an assessment navigation interface, for example, as illustrated in FIG. 12.

In some implementations, the GUI illustrated in FIG. 11 may show the location, name of the timeline, space, etc.

In some implementations, the timeline application 408 may display, for example, in response to receiving a selection of the note taking element 1104, the example GUI illustrated in FIG. 13, which may allow a note to be added directly to a timeline. For example, the GUI illustrated in FIG. 13 may include one or more selectable elements 1302 and 1304 to generate a note that is not linked to a specific image. For instance, these annotation elements may include a textual note element 1302 or audio note element 1304 that allow a note be added to the timeline as if it were an image (e.g., between images in the timeline), as described elsewhere herein. In some instances, a user may pull the assessment interface up, select a note taking element, and insert a note into the timeline. In some instances, a confirmation element 1306 that may be selected to confirm the addition of the note to the timeline.

In some implementations, the timeline may provide the example GUI illustrated in FIG. 14, which may be used to receive items. For instance, the GUI may include a photo capture element 1402, video capture element 1404, and/or menu display element 1406, as described above. The menu display element 1406 may display a graphical menu and/or note taking options, as described elsewhere herein.

Figures 28, 29:
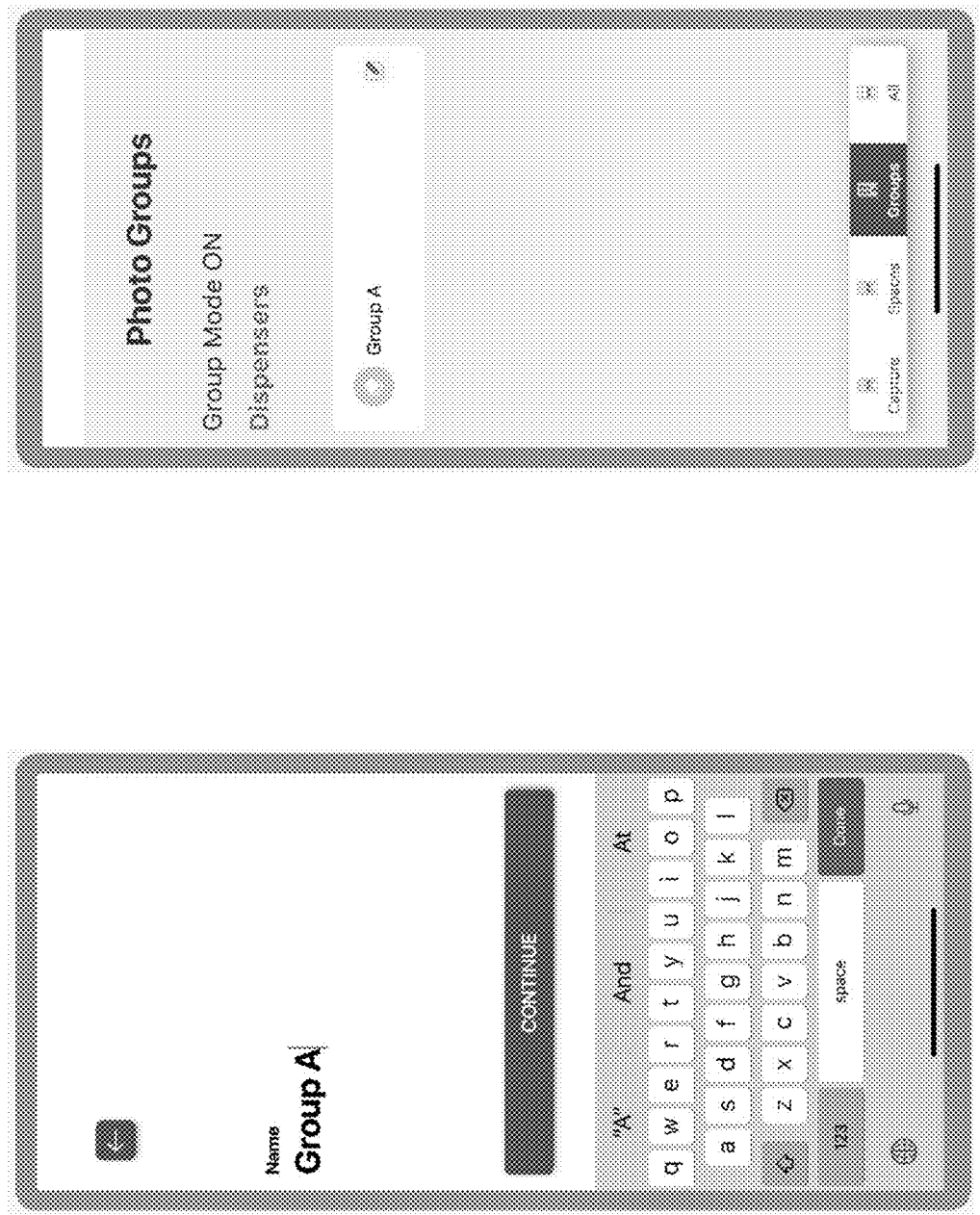

In some implementations, the timeline application 408 may receive a selection of a new space or a new group, for example, as described in reference to FIG. 12 or 28, respectively, as described below.

At 308, the timeline application 408 may determine whether the item includes a new space, for instance, if the instruction to add the new item is received via the example GUI illustrated in FIG. 12. The GUI may include one or more graphical elements 1202 for adding a new space at a given level to the timeline.

Figure 37:
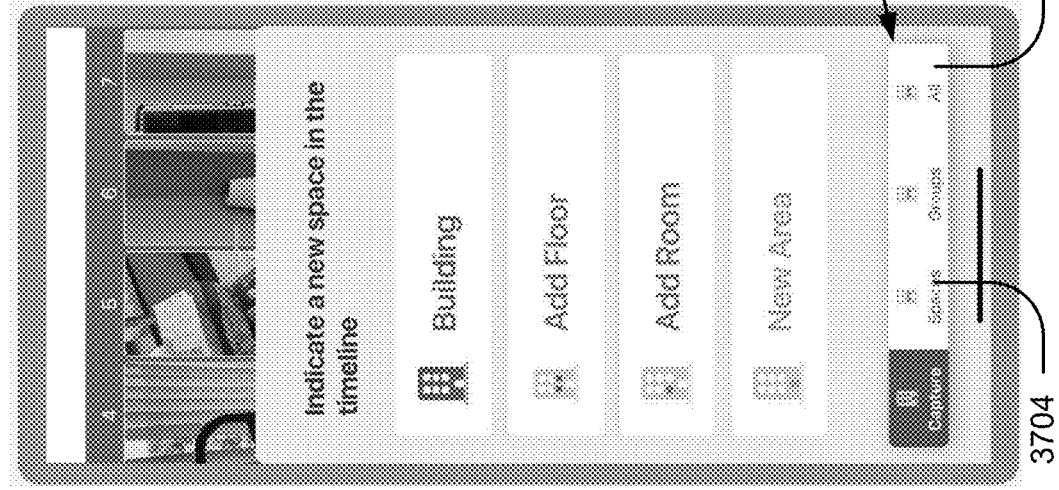

Another example implementation of the GUI of FIG. 12 is illustrated in FIG. 37. As illustrated in FIG. 37, the GUI may include navigation display region 3702, which, when selected, may cause the timeline application 408 to display spaces, groups, etc. For example, when a spaces element 3704 in the navigation display region 3702 is selected, the GUI illustrated in FIG. 38 may be displayed, which may list groups. Similarly, when a display-all element 3706 element is selected, the timeline application 408 may display, for example, one or more of the example GUIs illustrated in FIGS. 45-48 and described below.

At 310, the timeline application 408 may add the space to the timeline. For example, the timeline application 408 may add an entry to a file associated with the timeline indicating that all or a portion of the timeline belongs to or is associated with the space.

At 312, the timeline application 408 may update storage accessible to the client device 406 using the new item. For example, when an item, such as an image, annotation, or other item is added to an assessment from a client device 406 (e.g., an IOS® or Android® device) the timeline application 408 may transmit data describing the added item to a database hosted on a remote server. The data may be transmitted via APIs (application programming interfaces) along with other relevant information about the assessment, timeline, or item (e.g., a time stamp, associations, etc., as described below), so that the assessment, timeline, or item may be accessed later, for example, via different client device 406.

For example, when an image is uploaded to the note server 422 (e.g., via the web server 424), the image may be stored in the photo storage database 426. In some implementations other data, such as a textual annotation, may be uploaded and stored separately in a structured (e.g., SQL) database 428 along with information of the path where the image field related to the text (or other item) is saved in the photo storage 426.

In some instances, the timeline application 408 may automatically update remote storage if the client device 406 is connected to Wi-Fi but, if connected to a mobile network, may store the data for later upload when a network or Wi-Fi connection is restored. In some implementations, when an assessment, timeline, image, annotation, or other item has been successfully synced or uploaded to the note server 422, a graphical element (e.g., graphical indicator, preview image, etc.) may be modified, for example, by changing the color, shape, or presence of the graphical element to indicate that the data has been uploaded.

In some instances, syncing the assessment data to the note server 422 may allow the assessment, timeline, or items to be displayed for a different type of client device 406, such as a desktop computer with a larger screen size, faster processor, or higher bandwidth. Accordingly, the current assessment data may be accessible, for example, via a desktop version of the interfaces, a browser, etc., as described in reference to FIGS. 50-52. The desktop version may allow a user to more easily sort, search, filter, or take other actions respective to the assessment items.

At 314, the timeline application 408 may update a GUI displayed on a display device of the client device 406 based on the added item. For instance, as described in further detail above, an image preview, annotation preview, or other graphical indicator may be updated in a representation of the timeline (e.g., in a preview region).

At 316, the timeline application 408 may determine whether the item includes a timeline note and, at 318, the timeline application 408 may add the timeline note to the timeline. For example, as described in reference to FIG. 2, 11, or 13, a note may be added directly to the timeline and a representation of the timeline (e.g., in the preview region) may be updated accordingly.

At 320, the timeline application 408 may determine whether the item includes a new group. For example, as described in reference to 306 above, the timeline application 408 may display an interface at which a new group may be added. For instance, the timeline application 408 may display the GUIs illustrated in FIGS. 28, 29, and/or 30 to add and/or display groups. These GUIs may facilitate adding, naming, editing, viewing, or deleting groups.

In some implementations, the timeline application 408 may provide one or more of the example GUIs for viewing groups or adding items to groups illustrated in FIGS. 31-32, which are described in further detail below.

Figure 43:
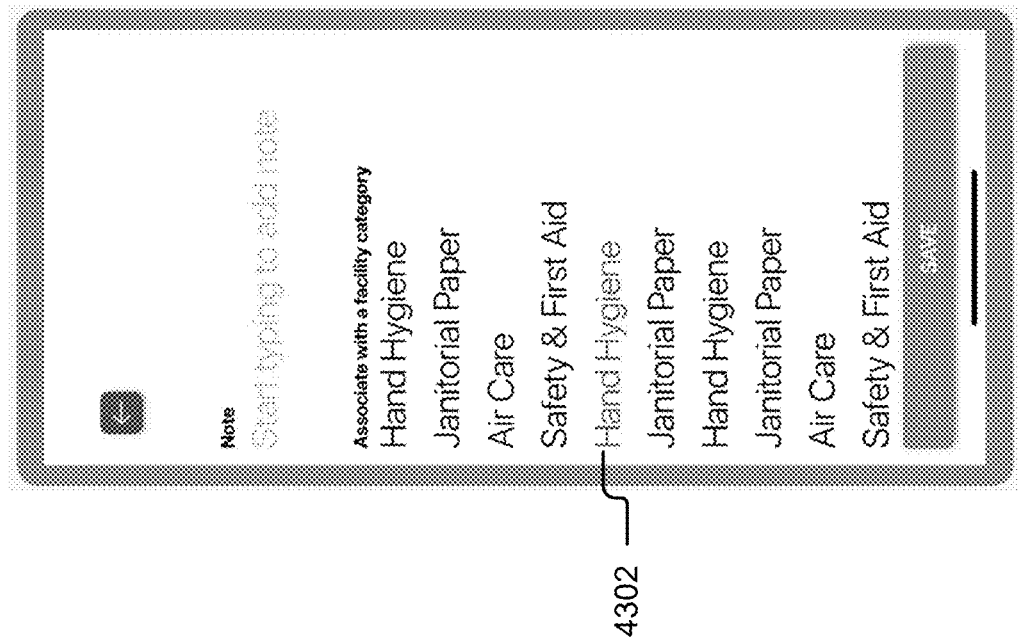
Figure 44:
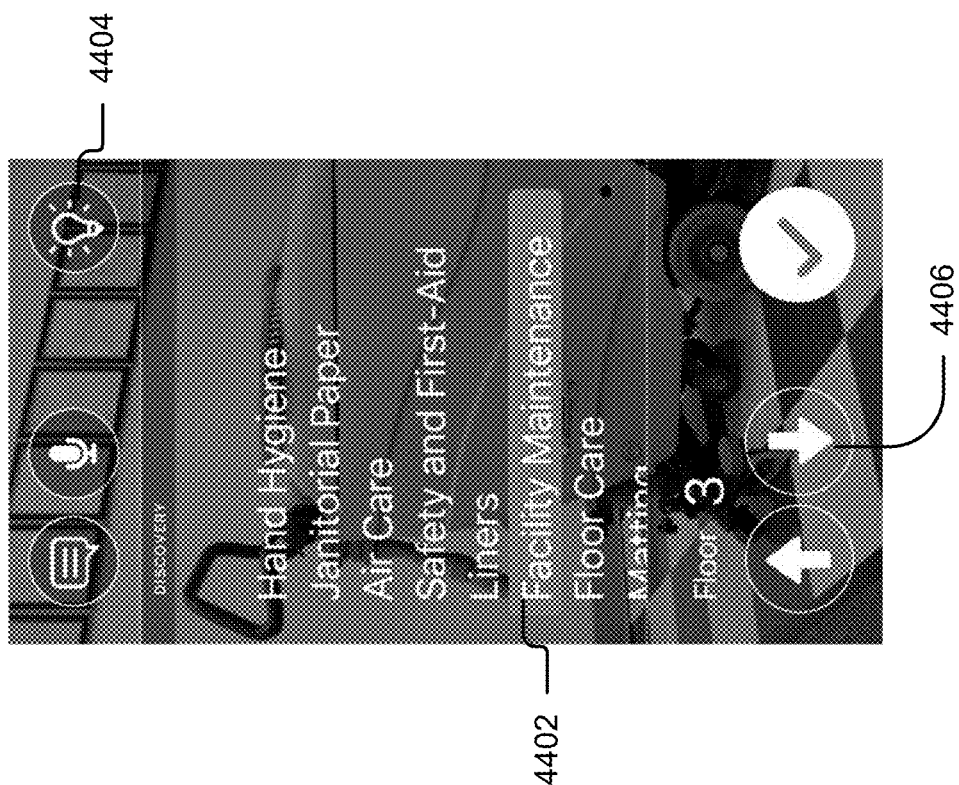

In some implementations, the timeline application 408 may provide the example GUIs in FIG. 43 or 44 for grouping items (e.g., displayed by selecting the assessment element). For instance, the GUIs in FIG. 43 or 44 may be used to add items to a group. For instance, the GUIs in FIGS. 43 and 44 may add a flag or other annotation to associate an item with a group or category. In some implementations, the timeline application 408 may display one or more graphical elements 4302 or 4402 that may be selected to change a category of photos or assessments. For example, the graphical elements 4302 or 4402 may depict categories that the timeline application 408 may use to create individual timelines, groups of images, notes in timelines, and/or tags indicating that the images, notes, or other items belong to the category. For instance, a category may indicate that an image or series of images belong to a category, such as facility maintenance, cleaning tools, equipment, breakroom supplies, etc. Accordingly, a selected category may identify each image taken after the selection of the category.

In some implementations, some graphical interfaces described herein, such as illustrated in FIG. 44, may include a selectable graphical element 4404 that causes the timeline application 408 to display one or more help items. For instance, in response to receiving a selection of the graphical element 4404, the timeline application 408 may display a GUI showing help items, reminders, trigger ideas, etc. in some instances, the GUI may include a graphical element 4406 that is selectable to indicate a floor or area of a facility on which images are taken. For instance, the images may be tagged with a floor identifier, which may be determined based on the element selectable to indicate the floor.

At 322, the timeline application 408 may add the group to the timeline. For instance, when a group is created or items are added to a group, they may be linked together in an assessment file, as described in further detail elsewhere herein. Additionally, the timeline application 408 may display one or more GUIs, such as those illustrated in FIGS. 31-32 to represent groupings of items.

Figure 31:
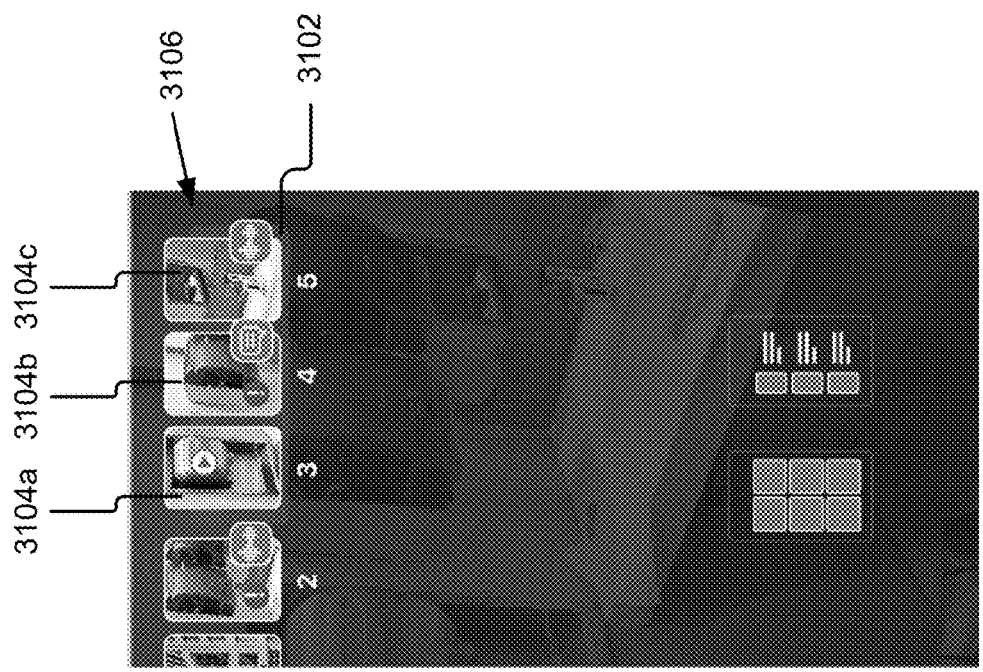
Figure 30:
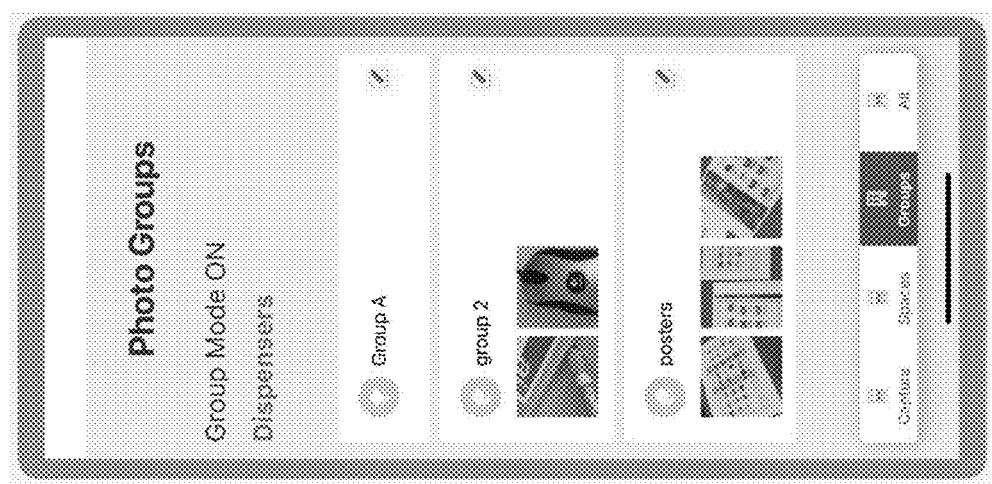
Figure 32:
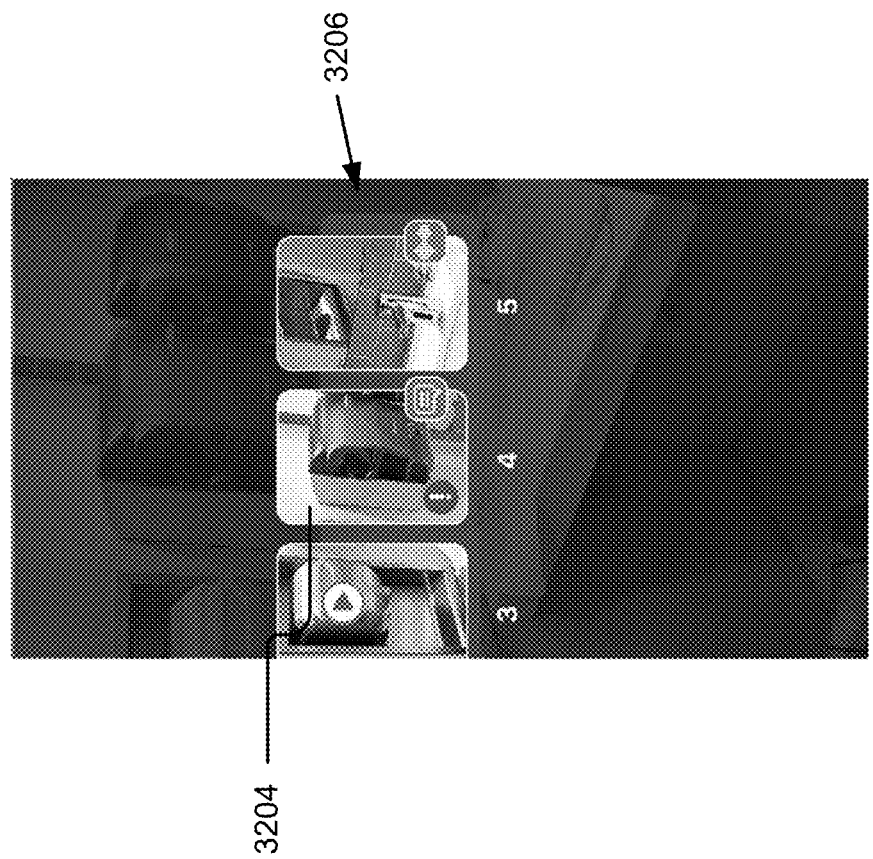

For example, FIG. 31 illustrates a graphical element 3102 clustering image previews 3104a, 3104b, and 3104c together in the preview region 3106. For instance, the timeline application 408 may indicate grouped images by highlighting the image previews in the group with a box around all or a portion of the image previews. In some instances, the user may drag the box or otherwise highlight the items to add them to a group.

In some instances, the timeline application 408 may receive an input instructing the timeline application 408 to increase the size of the preview region 3106 in the GUI, for example, by the user dragging the preview region 3106 downward, selecting the preview region 3106, etc. For example, the example GUI illustrated in FIG. 32 illustrates an enlarged preview region 3206. The enlarged preview region 3206 may also allow items to be more easily grouped.

In some implementations, a set of images taken in a series (or otherwise selected) may be automatically grouped (e.g., based on metadata of an image or associated note). The group of images may be automatically grouped based on having a common tag, being taken from a common original image, being taken within a given time period, etc.

In some implementations, at 324, the timeline application 408 may receive a selection of timeline items to add to the group. For example, a set of images taken in a series (or otherwise selected) may be manually grouped based on input from the user, for instance, using an example GUI illustrated in FIGS. 28-32. For example, in response to receiving a selection of a grouping option, the timeline application 408 may group a series of images together. In some implementations, the timeline application 408 may allow the user to associate annotations with an entire group and/or with individual images in the group. For instance, the application may receive an audio recording and map the audio recording jointly and/or severally to the images in a group of images.

Figure 18:
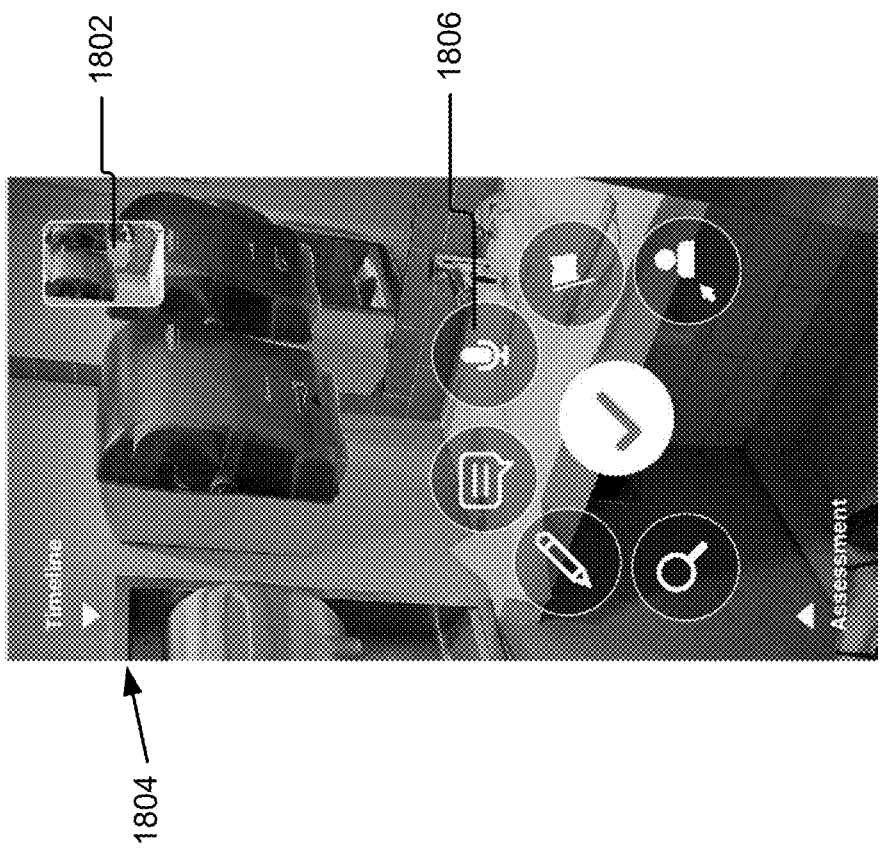

At 326, the timeline application 408 may determine whether the item includes a photograph. For example, as described in reference to 306 above, the timeline application 408 may communicate with a camera or file system of the client device 406 to receive an image. As described above and as illustrated in FIGS. 16-18, an image may be received and added to the timeline. For example, in FIG. 16 a user may select a photo capture element 1602, which may cause the timeline application 408 to display the example GUI illustrated in FIG. 17 that may display a viewfinder of a camera of the client device 406. The user may select a capture element 1702, which may cause the captured image to be automatically added to the timeline (e.g., as illustrated in FIG. 18 and described in reference to 330-332).

Figure 23:
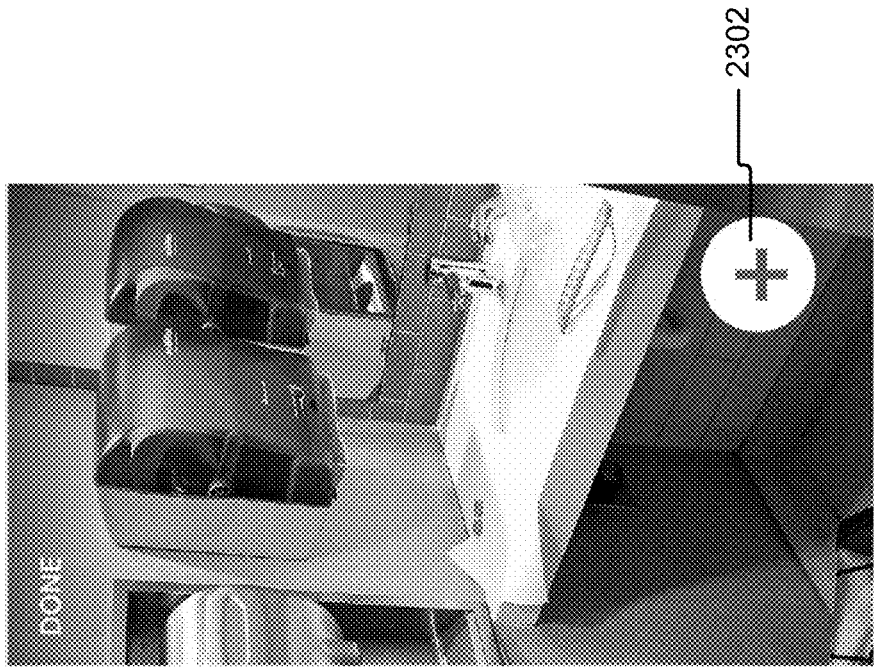
Figure 25:
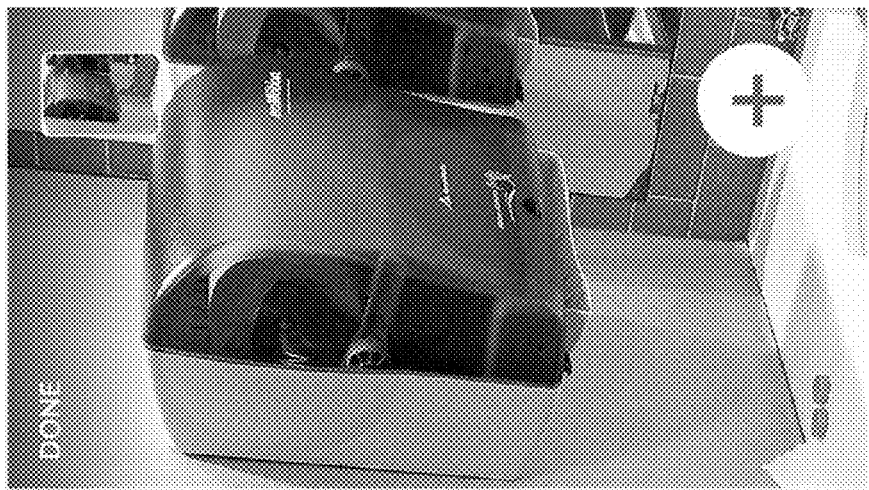
Figure 24:
Figure 27:
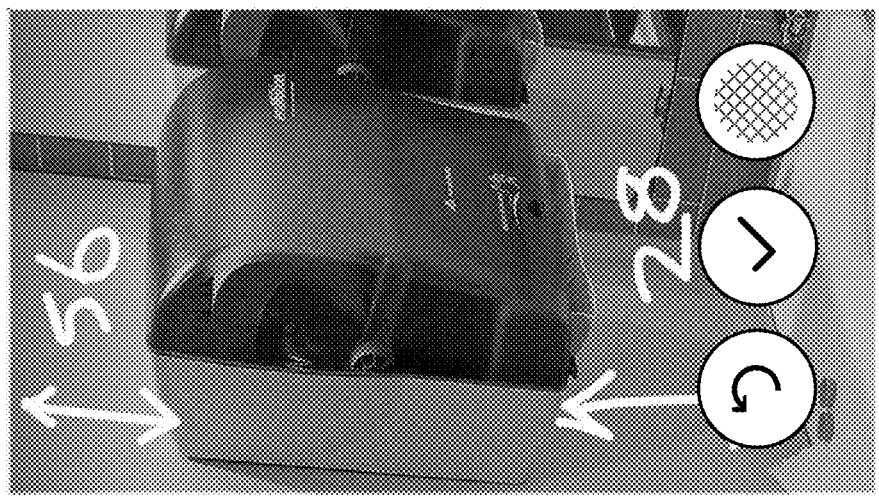

In some implementations, the timeline application 408 may also allow an additional photograph/image to be extracted from an existing image. For example, as illustrated in FIGS. 23, 24, and 25, a first image may be added to a timeline and a second image may be added based on the first image. In some implementations, the timeline application 408 may enable a user to extract multiple images from a single image without capturing additional photos on the client device 406 (e.g., using a camera coupled with the client device 406).

For example, a client device 406 may capture a photo of an entire bathroom (or break room, supply closet, kitchen, etc.), use that image to zoom in on several different objects in the image, and create images or screen grabs from that image. For instance, this feature allows a user to zoom in on aspects of an image, take images of the aspects, and annotate the individual images or groups of images, etc. In some implementations, after a tour of a facility, a user of the timeline application 408 might review the images and remember other notes, flags, etc., to link with the images or aspects thereof, so the application allows the user to augment previously made notes on an image.

For example, as illustrated in FIG. 23, the example GUI may include an image generation symbol 2302 or crop graphical element (e.g., as illustrated at 212a in FIG. 2) that may capture new images in the timeline based on an existing image. For example, in some implementations, the timeline application 408 may overlay an image generation symbol 2302 over a recently captured image, which may be selected to generate an additional image from the existing image. For example, as illustrated in FIGS. 24 and 25, a user may zoom (e.g., using a pinch-to-zoom gesture) into an image and select the image generation symbol 2302, which may cause the timeline application 408 to attached the new zoomed image to the timeline (e.g., the timeline application 408 may automatically crop the image to the zoomed or otherwise cropped location). Multiple images may be automatically added to the timeline using this feature. In some instances, each of the images taken from an original image may be automatically inserted (e.g., the new images may have a timestamp based on the original image) into the timeline next to the original image or, in some instances, the original image may be selected from the timeline and expanded to show the images taken from the original image.

For example, FIG. 31 illustrates a GUI in which multiple related images 3104a, 3104b, and 3104c (e.g., image previews associated with the images) are automatically associated together in the preview region 3106.

In response to determining at 326 that the item includes a photograph, the timeline application 408 may determine whether the photograph is associated with a group or another photograph at 328. For instance, the timeline application 408 may determine whether the image is associated with a group, for example, as described in reference to FIGS. 23-25 and 28-31.

In response to determining at 328 that the photograph is not associated with a group or another photograph, the timeline application 408 may add the photograph to the timeline at 330. For instance, the timeline application 408 may determine a position in a series of images at which to insert the image based on a space, flag, timestamp, or user input, for example.

At 332, the timeline application 408 may generate and store a thumbnail of the photograph. The thumbnail may include an image preview of the captured image, for example, as described in further detail above. For example, after an image is captured in the example of FIG. 17, the timeline application 408 may provide an example GUI illustrated in FIG. 18. For example, an image preview 1802 (e.g., a thumbnail image) may be displayed in a preview region 1804 based on the image being captured. The timeline application 408 may determine the order of image previews (or annotation previews, graphical indicators, items, etc.) based on the order of the timeline, as described above.

In response to determining at 328 that the photograph/image is associated with a group or another photograph, the timeline application 408 may add the photograph to a group in the timeline at 334, for example, as described above in reference to 320-324.

At 336, the timeline application 408 may determine whether the item includes an annotation associated with the photograph. For example, as described in reference to FIG. 2 and to the operation at 306, the annotation may include an audio recording, video recording, textual comment, flag, tag (e.g., of varying types), star, alert, drawing, etc., associated with an image.

In some implementations, a timeline application 408 may receive an instruction to record an audio file via the graphical menu element 1806 illustrated in FIG. 18 (e.g., displayed after an image is captured or selected). For example, as illustrated in FIG. 18, the timeline application 408 may display a graphical menu with a series of graphical elements providing options that surround a center button. In some implementations, the center button may be used to take photos, move to the next photo, open the menu, or provide other operations, as described in FIG. 2 above. For example, rather than writing in a physical notebook, or having to remember specific details, the graphical menu can be used to annotate a photo or otherwise link various types of data with the photo. For example, when a user takes a photo, the user can select a center button to add the photo to the timeline or may add/associate notes, audio, etc., to the photo.

Figure 19:
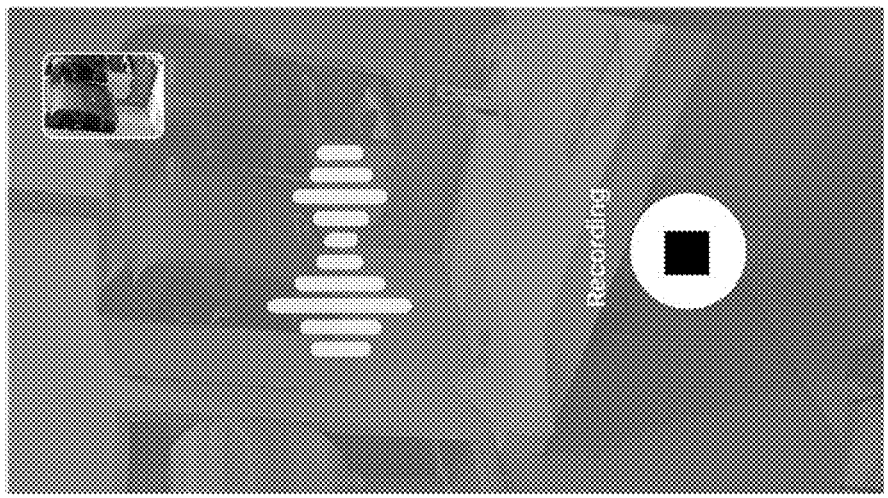
Figure 20:
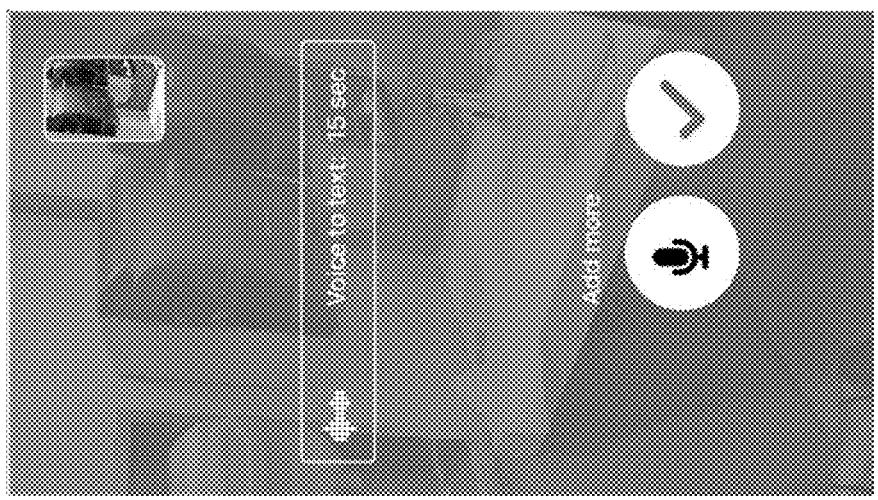

In response to selecting the menu element 1806, the timeline application 408 may record audio, as illustrated at FIG. 19. The GUI illustrated in FIG. 19 may be overlaid over the image to which the audio file (or text transcription) will be linked to clarify the image to which the file is linked. In some implementations, as illustrated in FIG. 20, the timeline application 408 may automatically convert the audio recording to text. For example, the timeline application 408 may automatically transcribe the audio recording and link the transcription with the image in addition to or in place of the audio recording. FIG. 20 illustrates a graphical interface providing details (e.g., a duration of the recording) about the recording and, in some instances, transcription thereof.

Figure 26:
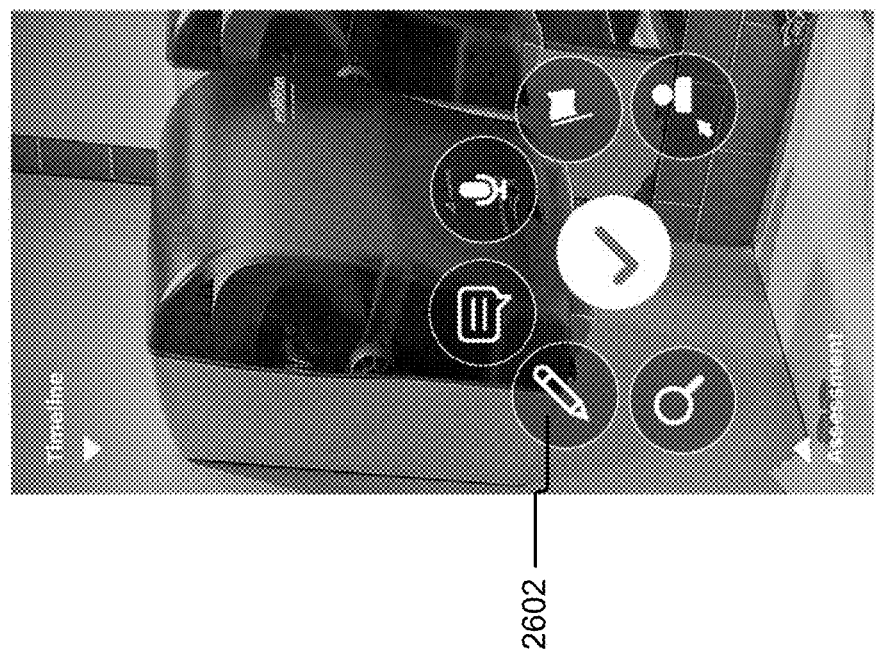

In some implementations, the timeline application 408 may receive an instruction to draw on an image via graphical menu element 2602 illustrated in FIG. 26. For example, in response to receiving a selection of the graphical menu element 2602, the timeline application 408 may display the interface illustrated in FIG. 27, which allows the timeline application 408 to receive drawings on the image. For instance, the graphical menu element 2602 may provide an option to write on the image (e.g., using a finger or stylus on a touch screen). For example, a user may write measurements on an image, which writing may cause the timeline application 408 to modify the image, create an additional image including the writing, or may add metadata to the image.

In some implementations, the timeline application 408 may include a built-in measuring utility, which, using lens angle, reference objects, depth sensor, multiple lenses, etc., may automatically determine one or more measurements in the image, which measurements may be automatically mapped with the image. For instance, a user may drag a reference marker from a first point on the image to a second point on the image, based on which the application may determine the distance between the first point and the second point in the real world.

Figure 39:
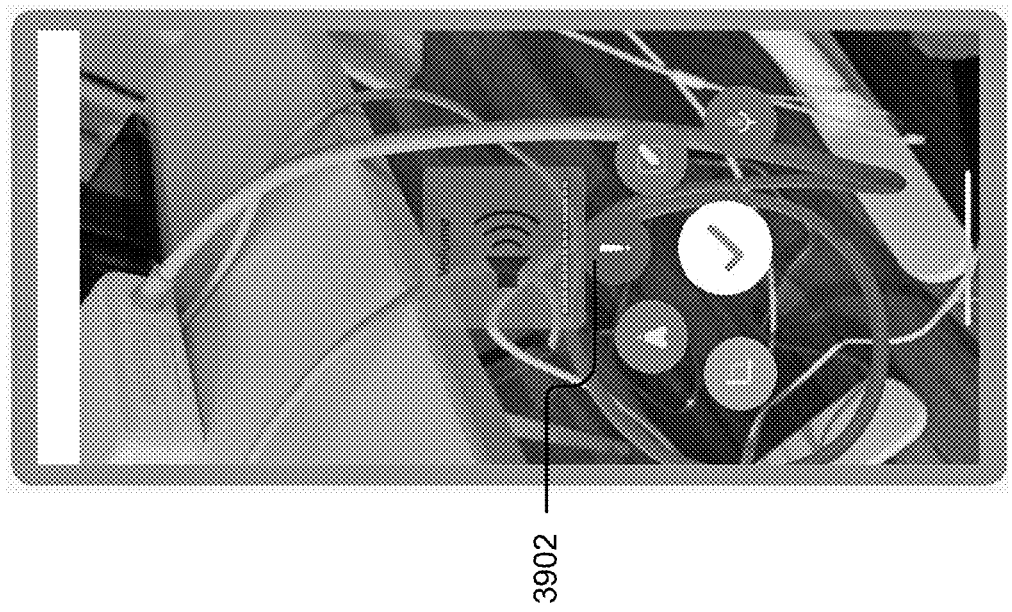
Figure 38:
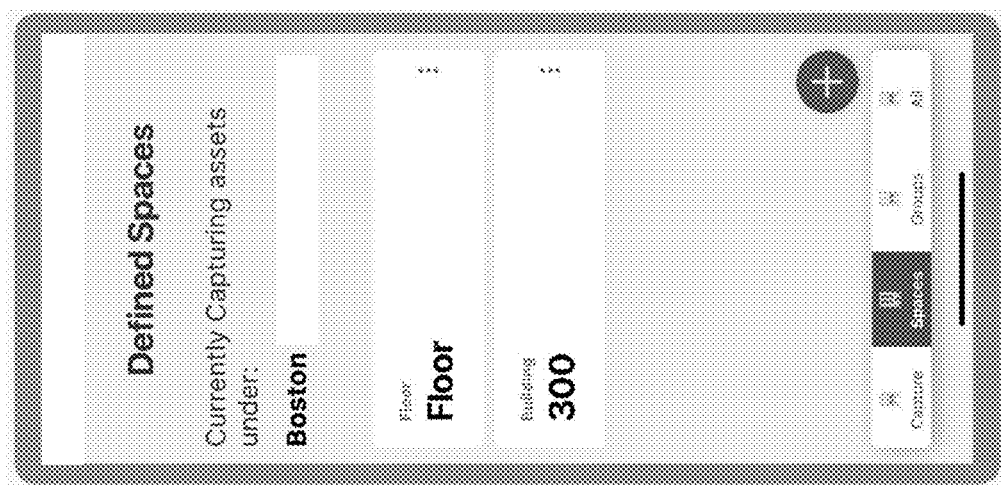

In some implementations, the timeline application 408 may receive a tag or alert via the graphical menu element 3902 illustrated in FIG. 39. For instance, in response to receiving a selection of the graphical menu element 3902, the timeline application 408 may display the example GUI illustrated in FIG. 40.

Figure 40:
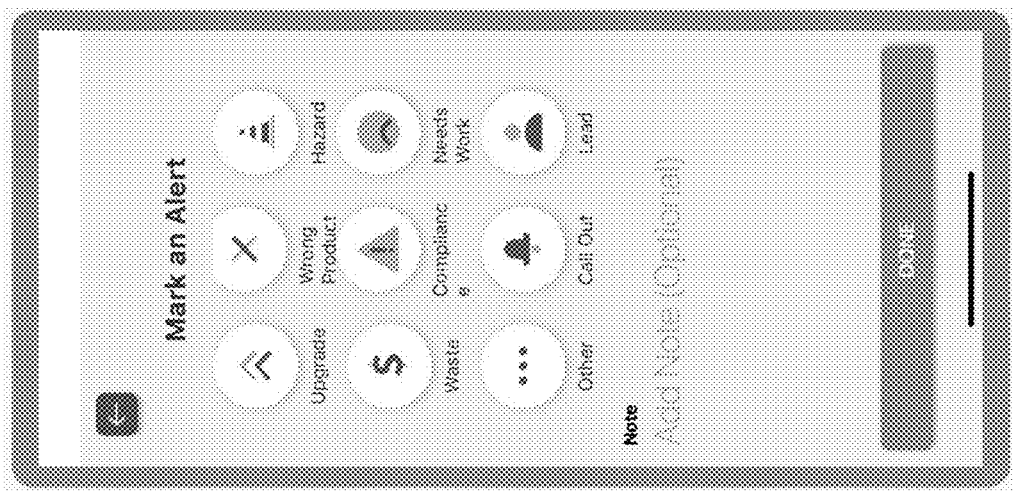

One or more of the tags illustrated in FIG. 40 may include associated icons, which may be displayed on an image in a timeline, for example, as described above. The tags allow a user to quickly tag an image as including a specific attribute, such as a hazard, usage of an incorrect product, an opportunity to upgrade a product, a waste of resources, an opportunity for a sale, an opportunity for improvement, or other types of tags. In some implementations, the tags may be used to automatically categorize, sort, or otherwise understand images. The tags allow images, annotations, etc., to be easily sorted, grouped, etc.

Figure 41:
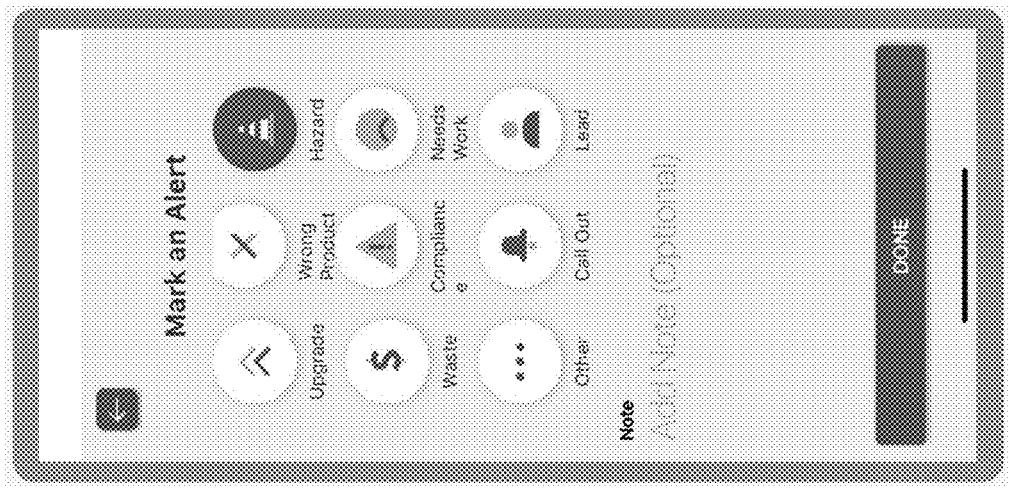
Figure 42:
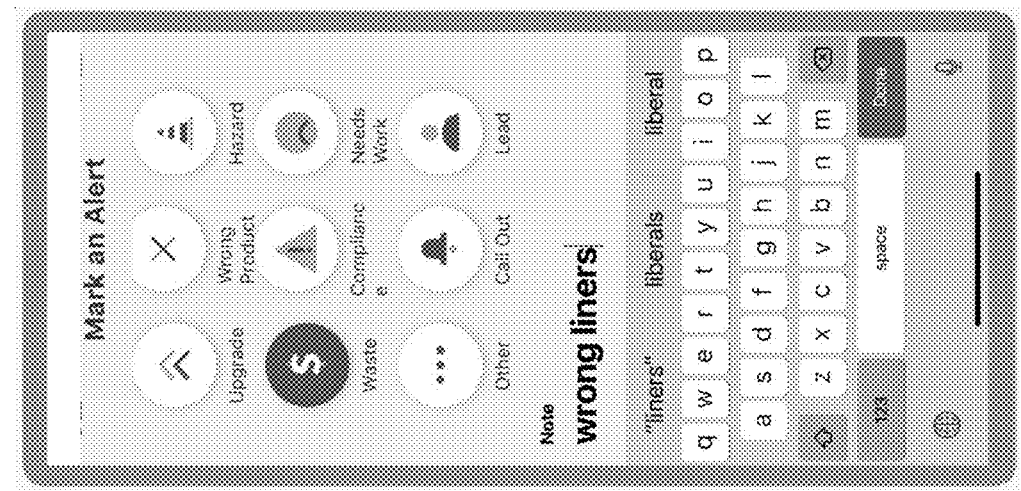
Figure 45:
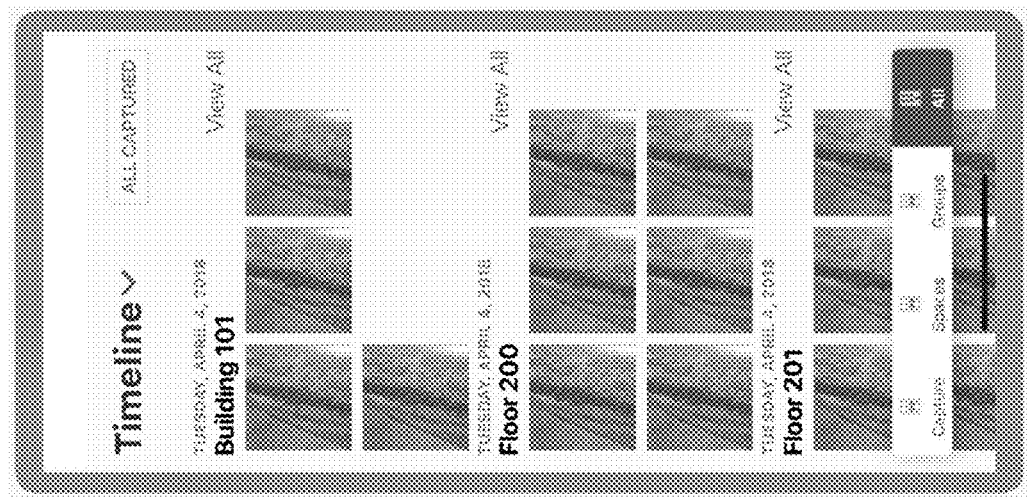

As illustrated in FIG. 41, once a tag is selected, it may be highlighted or modified to show that it is selected for the image. As illustrated in FIG. 42, the timeline application 408 may receive and associate a textual (or other type) comment with a tag, which may, in turn, be associated with an image.

In some implementations, a particular tag may cause the application to perform an additional action. For instance, a tag may indicate an opportunity for a sale, which may automatically notify (or prepare a notification) to client device 406 of (e.g., to an instance of the timeline application 408, an e-mail address, etc.) a sales representative. For example, in some implementations, a GUI displayed by the timeline application 408 may include a notification option (not shown) that, when selected by a user, automatically notifies or prepares a notification to another party. For instance, the application may prepare an e-mail with the annotated image and communicate with an e-mail application to save a draft of the e-mail.

In response to determining at 336 that the item includes an annotation associated with the photograph, the timeline application 408 may add the annotation to the photograph and/or thumbnail based on the selected annotation type at 338. For instance, as described above in reference to FIG. 2, an image preview of an image may be updated (e.g., modified, overlaid, etc.) to include a graphical indicator of the annotation. In some implementations, the graphical indicator may be generated based on the type of annotation associated with the image.

Figure 21:
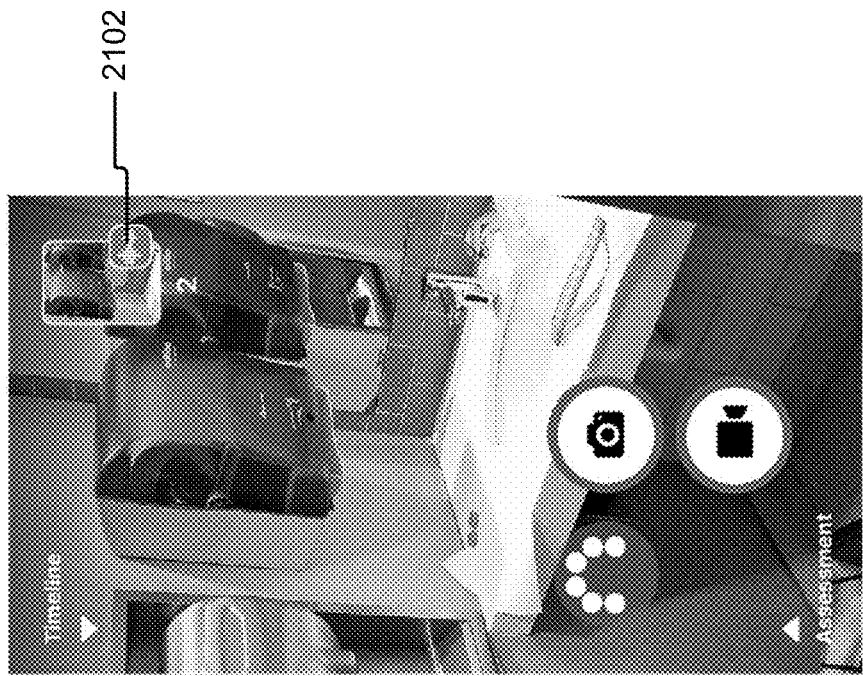
Figure 22:
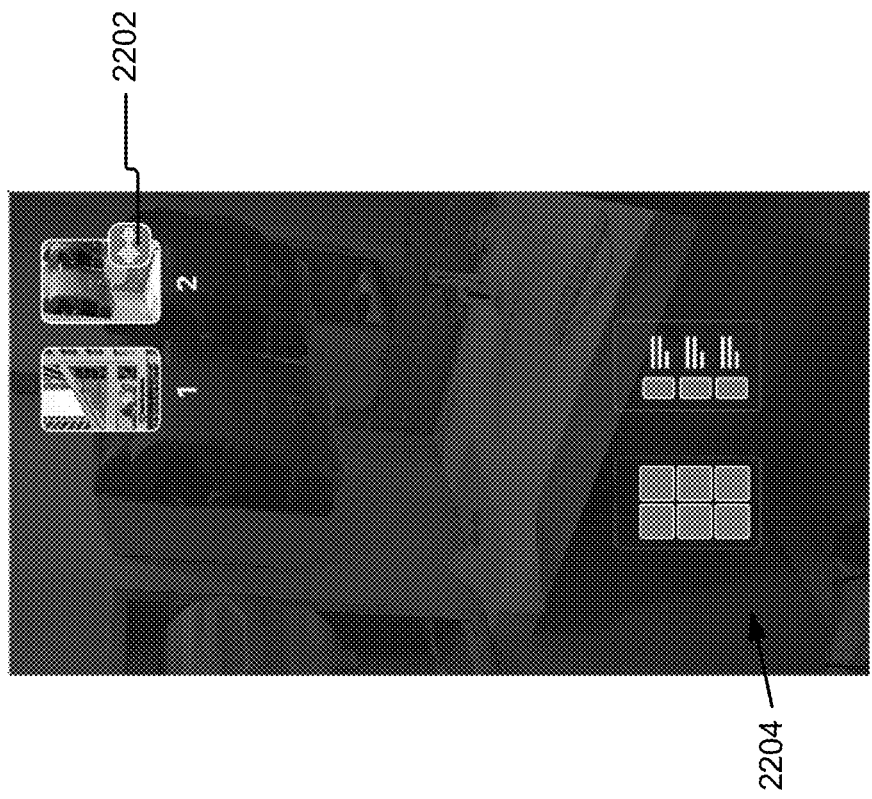

In some implementations, as illustrated in FIG. 21 or FIG. 22, for example, a graphical indicator 2102 or 2202 (e.g., an icon or thumbnail image), representing the recording (or other type of annotation) may be added to or overlaid over the corresponding image preview in the timeline in the preview region. For instance, when an audio file is recorded and linked to or associated with an image (e.g., as described in FIGS. 18-20), an icon representing the recording may be displayed over the corresponding image preview. The graphical indicator 2102 or 2202 may be selectable to playback/view, modify, delete, add notes, or view details about the recording. It should be noted that, although described in reference to an audio recording, the graphical indicators may additionally or alternatively be included on an image for other types of annotations, for example, a graphical indicator may be displayed for an audio recording, flag, hazard marker (e.g., as a red exclamation point), video recording, text note, tags (e.g., from FIGS. 40-42), etc., as described elsewhere herein.

At 340, the timeline application 408 may receive an instruction instructing the timeline application 408 to display the timeline. For instance, as described above, a timeline element or image preview region may be selected (e.g., clicked or pulled from a top, bottom, or side of a display), which causes the timeline application 408 to display the preview region or enlarge the image region.

At 342, the timeline application 408 may display a timeline interface with thumbnails and representations of notes based on the type of the client device 406 on which the instruction indicates to display the timeline.

In some implementations, as illustrated in FIG. 22, a timeline application 408 may display a timeline display option 2204 that instructs the timeline application 408 to display a preview region, image previews, etc., in varying formats. For instance, the timeline application 408 may provide an option to the user to view images (and, in some instances, associated annotations) in the timeline in a grid, list, carousel, or other type of interface. In some implementations, as illustrated in FIG. 32, the timeline may be further pulled down to increase the size of the timeline in the display in the GUI. For example, the timeline application 408 may receive an input using an input device of the client device 406. The input may instruct the timeline application 408 to expand the series of one or more annotatable image previews 3204 and increase a relative size of the series of one or more annotatable image previews 3204 within the GUI. In some instances, the series of one or more annotatable image previews 3204 may be horizontally scrollable within the GUI.

Figure 33:
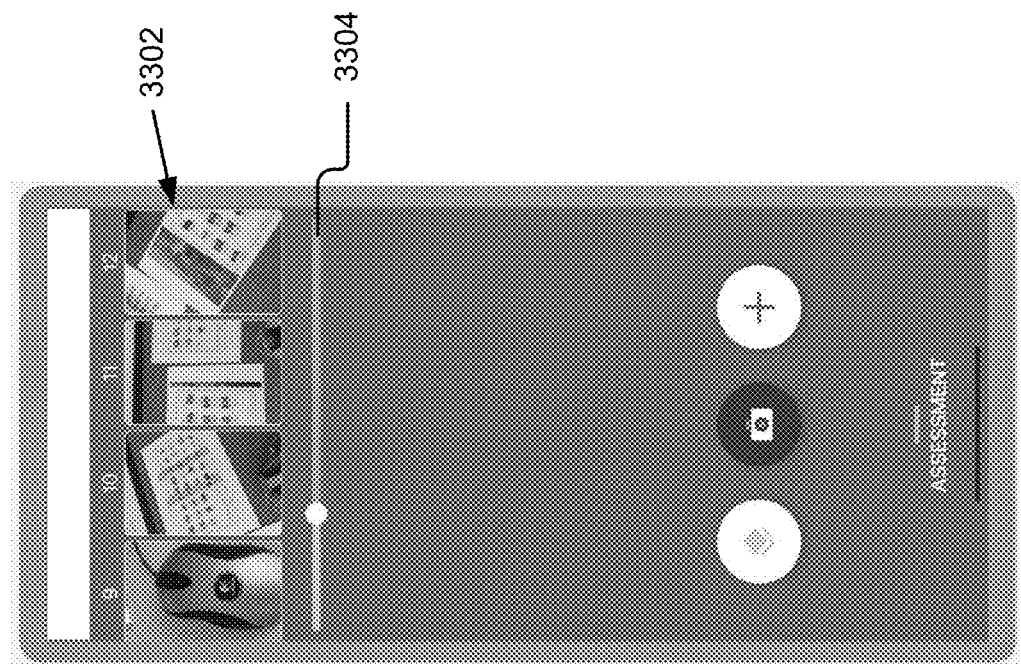

FIG. 33 illustrates an example GUI in which a preview region 3302 displays a series of annotatable image previews. In some implementations, the GUI may also include a scroll bar 3304 allowing the series of previews to be more quickly navigated.

Figure 34:
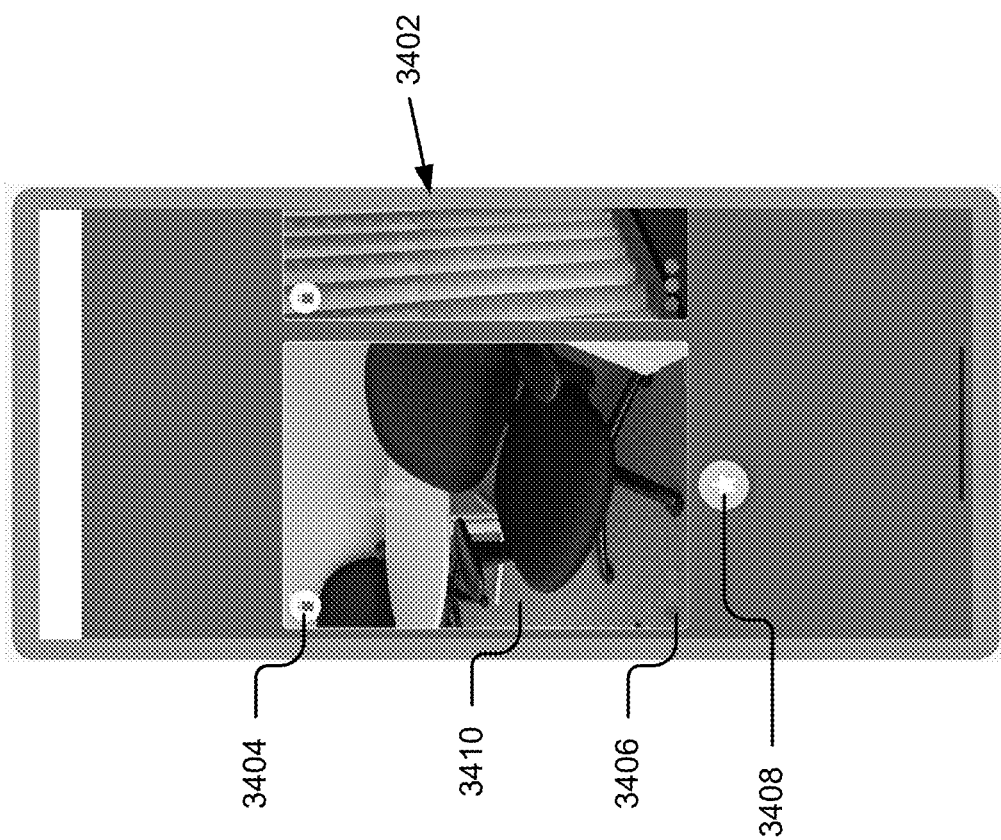

Another example implementation of the GUI described in 32 is illustrated in FIG. 34. In the illustrated example, the preview region 3402 has been expanded. The GUI may include an icon 3404 for deleting an image, one or more graphical indicators 3406 representing annotations to an image, and a star element 3408 selectable to mark an image as a key/important (e.g., in the way that the tags are described above) image.

Figure 35:
Figure 36:
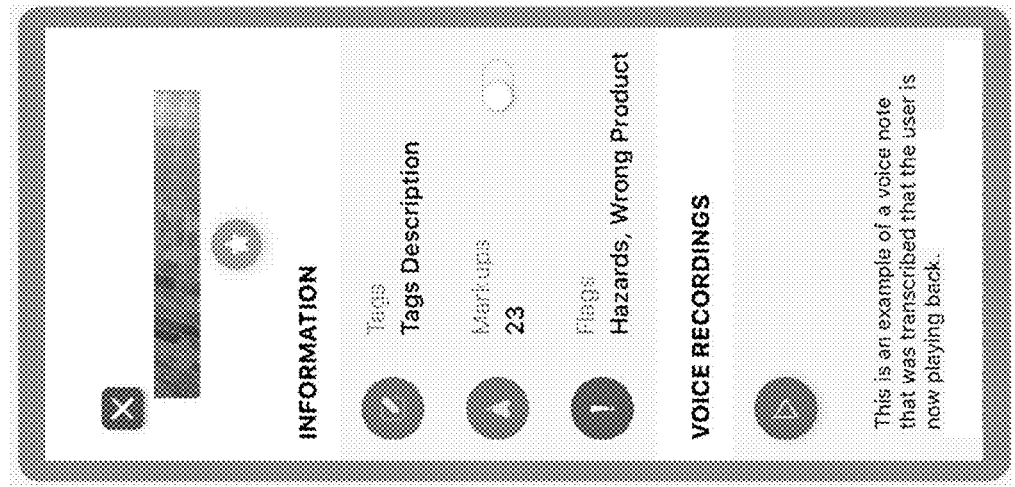

In some implementations, upon receiving input selecting, for example, an image preview 3410 in FIG. 34, the timeline application 408 may display the GUI illustrated in FIGS. 35 and 36, which display data relevant to the image. For instance, the timeline application 408 may show the image, the starred status, any tags, textual markups, flags/tags, voice recordings, transcriptions, etc.

Figure 47:
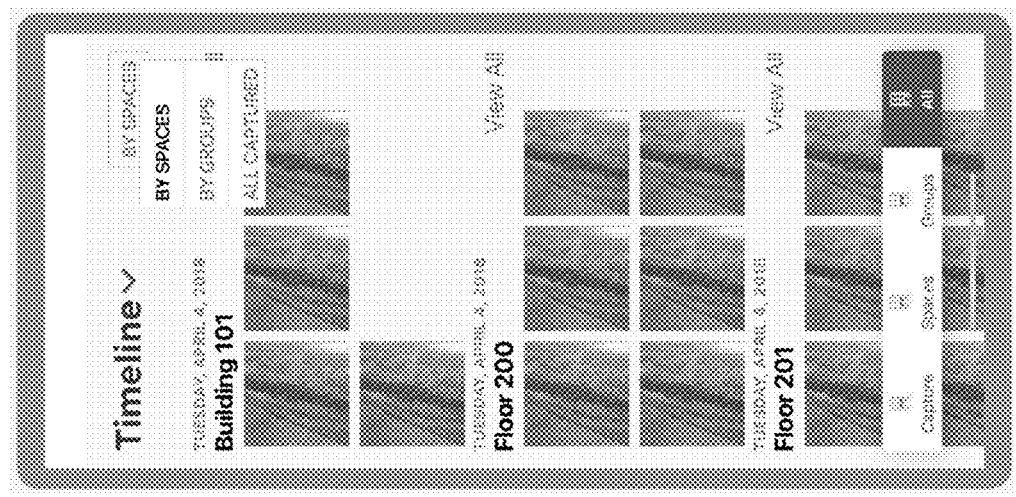
Figure 46:
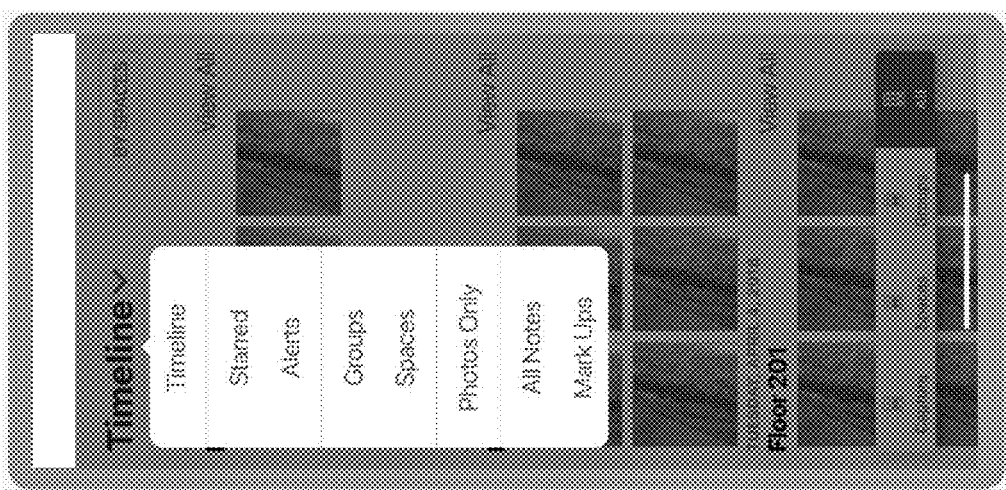

In some implementations, the timeline application 408 may display one or more of the example GUIs illustrated in FIGS. 45, 46, 47, and 48, which illustrate images sorted by space or another factor. For instance, FIGS. 46 and 47 shows dropdown menus by which images and/or annotations may be sorted, filtered, ordered, etc.

In some implementations, the timeline application 408 may determine a type of the client device 406. For instance, the type of the client device 406 may be a mobile electronic device (e.g., a smartphone, smart watch, etc.) or a desktop or laptop client device 406, for example.

For example, if it is determined that the client device 406 has a limited size screen, such as a wireless mobile electronic device (e.g., a smartphone, etc.), the timeline application 408 may provide interfaces, such as the examples illustrated in FIGS. 2 and 6-49, depending on the requested information.

Figure 50:
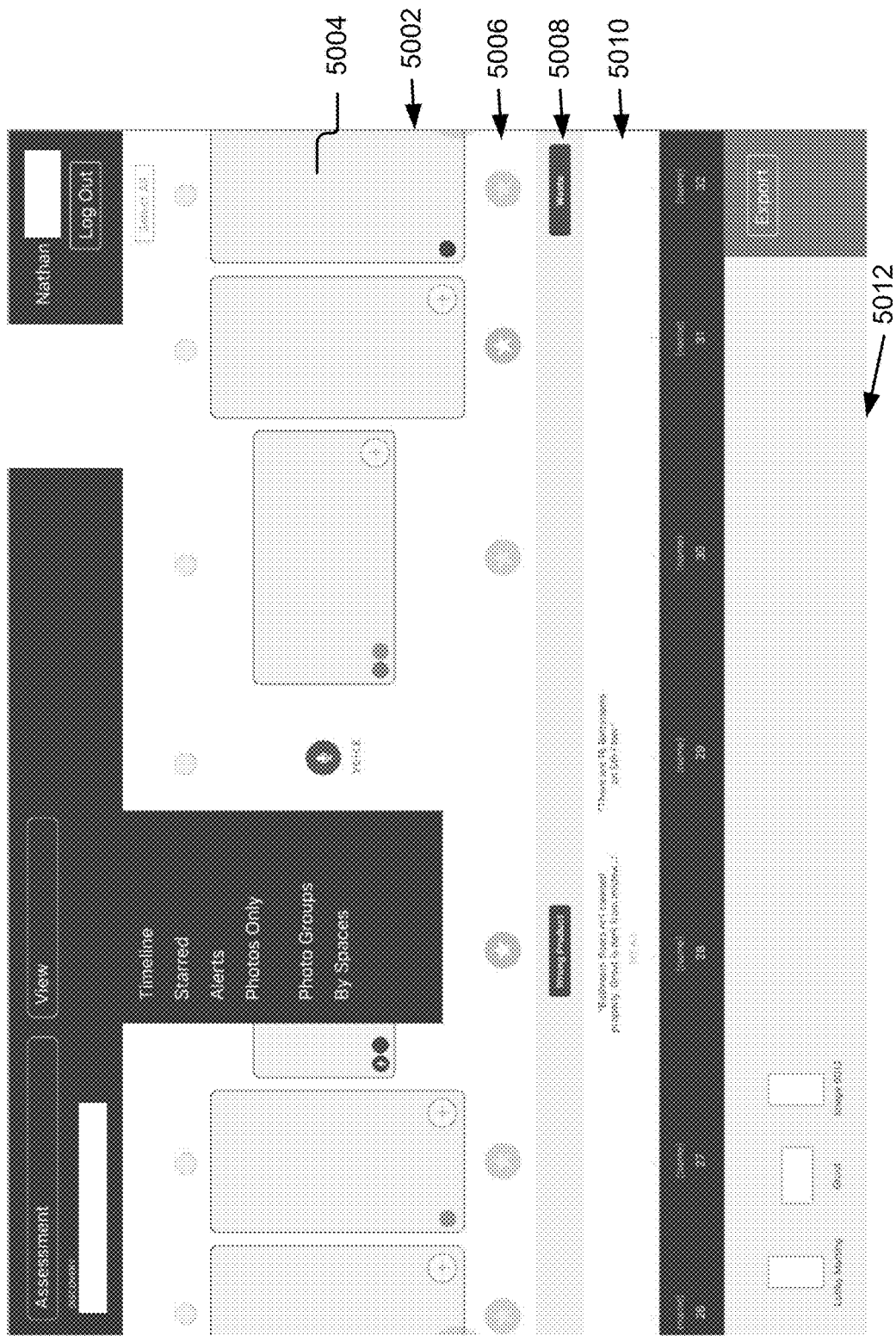
FIGS. 50-52 are illustrations of example desktop graphical user interfaces for accessing, modifying, and organizing images and annotations.
Figure 51:
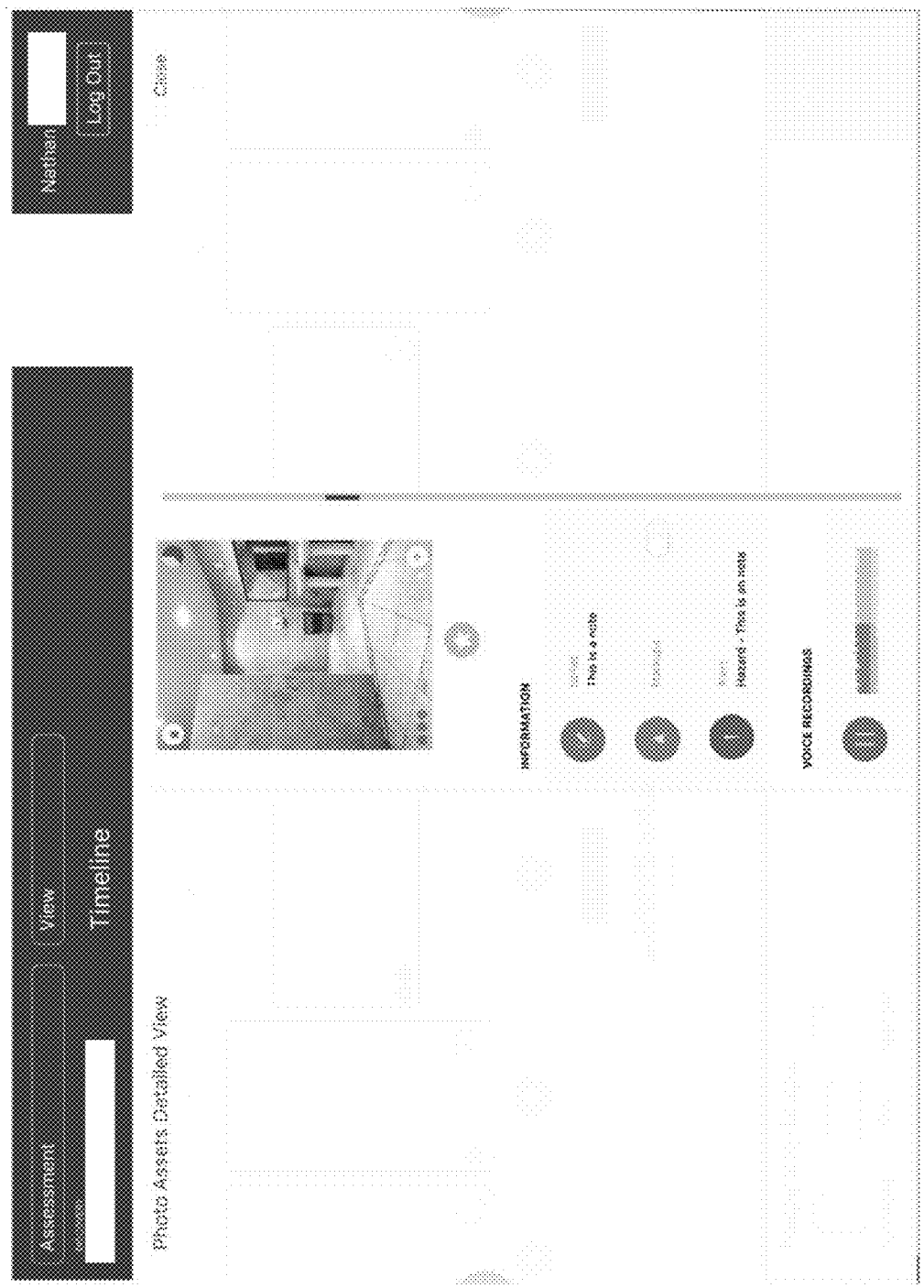
Figure 52:
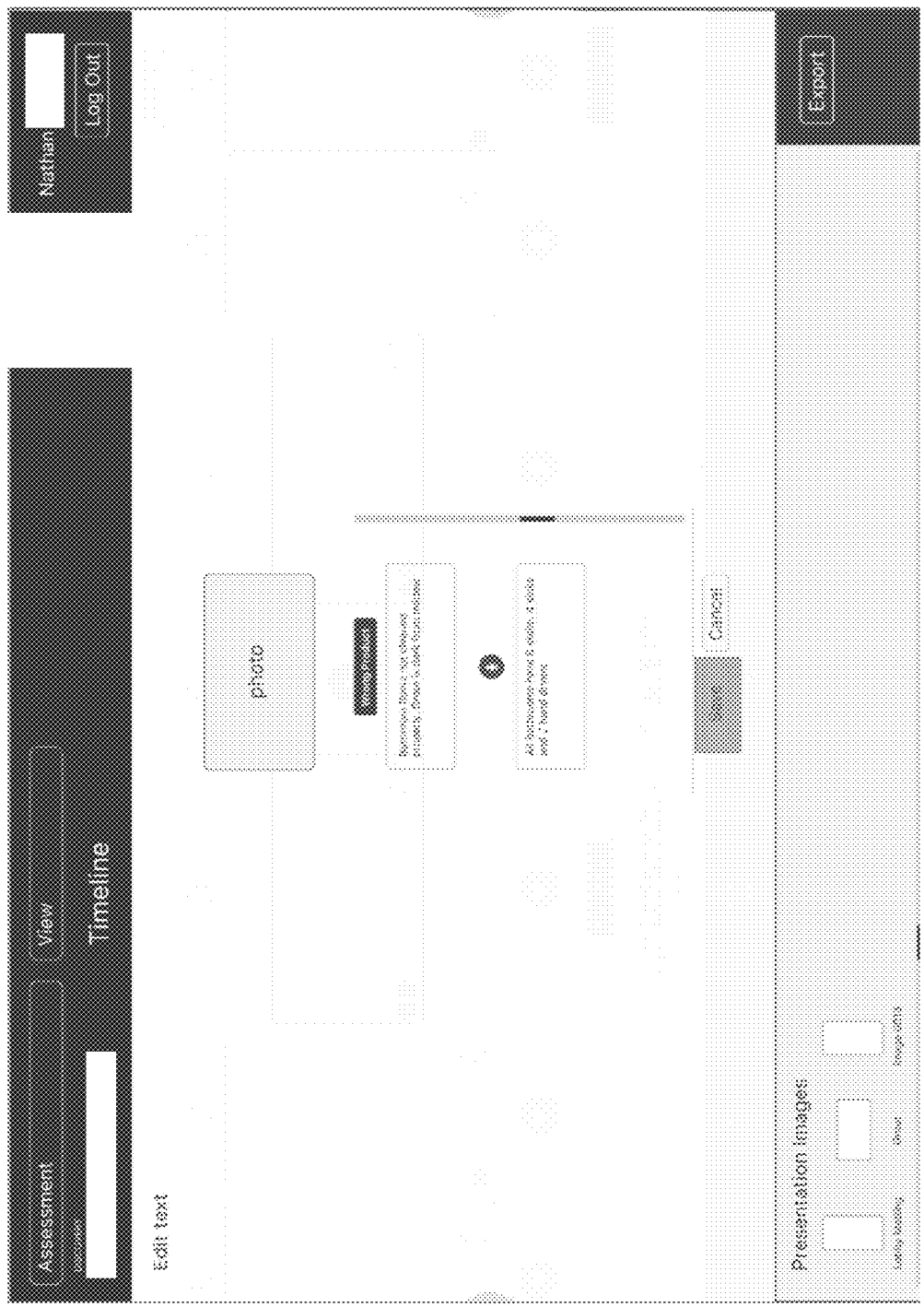

If it is determined that the client device 406 has a display of sufficient size or processing capability (e.g., a desktop or laptop), such as when a desktop computer accesses a website providing access to the timeline application 408, information may be retrieved from the note server 422, the timeline application 408 may provide more detailed GUIs, such as those illustrated in FIGS. 50-52.

In some implementations, the timeline application 408 may authenticate a session or client device 406, for example, using an authentication server and login credentials, depending on the implementation. Once the client device 406 is authenticated, the instance of the timeline application 408 operable on the note server 422 may fetch images from the photo storage 426 and annotations, timeline data, etc., from the database 428.

In some implementations, the timeline application 408 may display the GUI illustrated in FIG. 50, which may include, for example, a preview region 5002 with one or more image previews 5004 corresponding to, for example, the images, annotations, timelines, etc., described above. In some instances, the GUI may include a region 5006 displaying whether a particular image is starred, a region 5008 displaying one or more tags/flags, a region 5010 displaying textual annotations, and a presentation region 5012 to which images may be dragged or copied (e.g., from the preview region 5002). For instance, the regions 5006, 5008, and 5010 may display information corresponding to an image of an image preview 5004 displayed near (e.g., vertically above) the associated information in these regions.

In some implementations, a user may, for instance, drag an image preview 5004 into the presentation region 5012, so that the images and their associated annotations (text, audio, flags/tags, etc.) are automatically added to a presentation. The timeline application 408 may automatically present the images and corresponding annotations in a presentation (e.g., in a document, slideshow, etc.).

The GUI illustrated in FIG. 50 may allow the items in an assessment to be sorted, searched, ordered, etc.

The example illustrated in FIGS. 51 and 52 show expanded details associated with a particular image, for example, corresponding to the GUI illustrated in FIGS. 35 and 36, respectively.

In some implementations, at 344, the timeline application 408 may receive an instruction to save or exit the timeline or assessment.

Changes to the timeline, images, annotations, etc., made in the interface illustrated in FIGS. 50-52, for instance, may update the databases 426 and 428, so that the assessment file remains up to date and can be accessed from another client device 406. In some implementations, once the data is synced to note server 422, the timeline application 408 may automatically delete a local copy stored on the client device 406.

Figure 49:
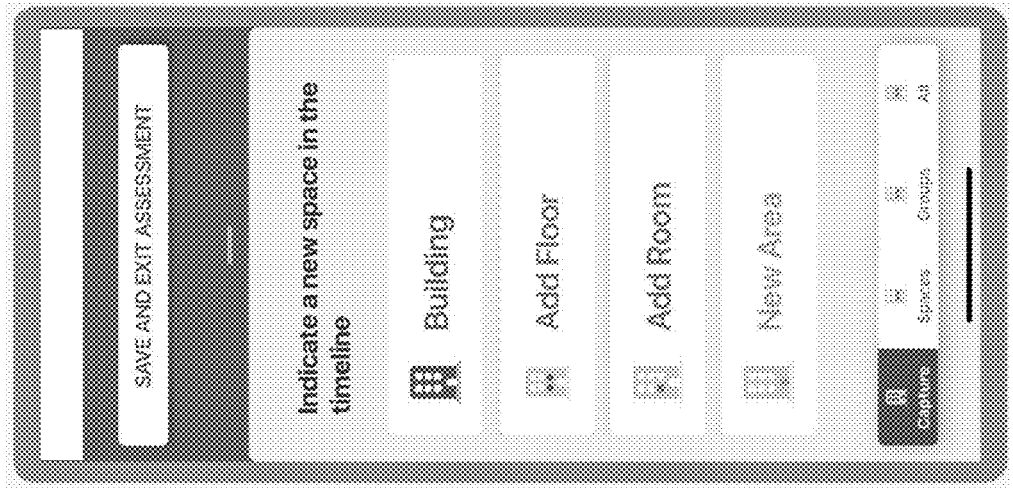
Figure 48:
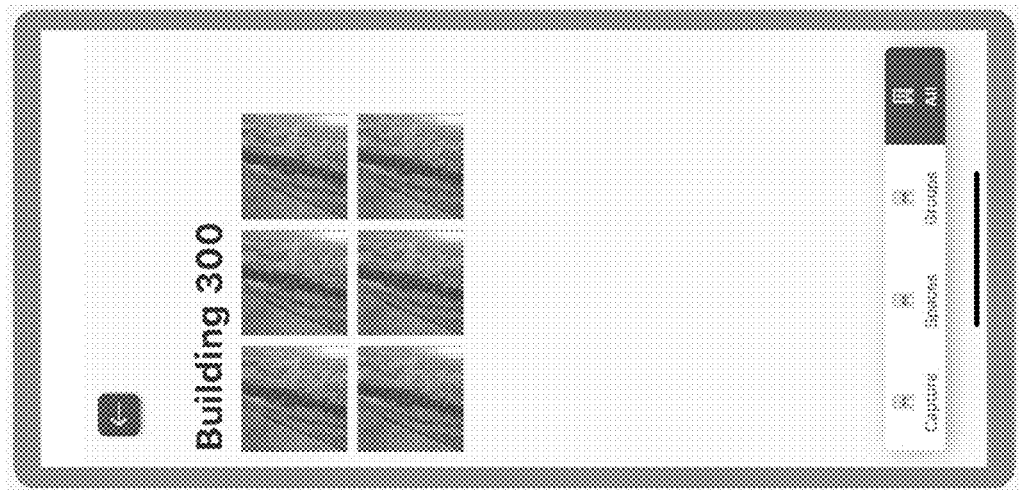

In some implementations, if the client device 406 is a mobile electronic device (e.g., a smartphone) the timeline application 408 may display a GUI, such as the example illustrated in FIG. 49, which allows a user to manually save an assessment, although other implementations (e.g., auto save, etc.) are possible and contemplated herein.

At 346, the timeline application 408 may synchronize the files of the photos, annotations, timeline, groups, spaces, assessments, or other files to the database accessible to the client device 406, for example, as described in reference to 312.

Figure 4:
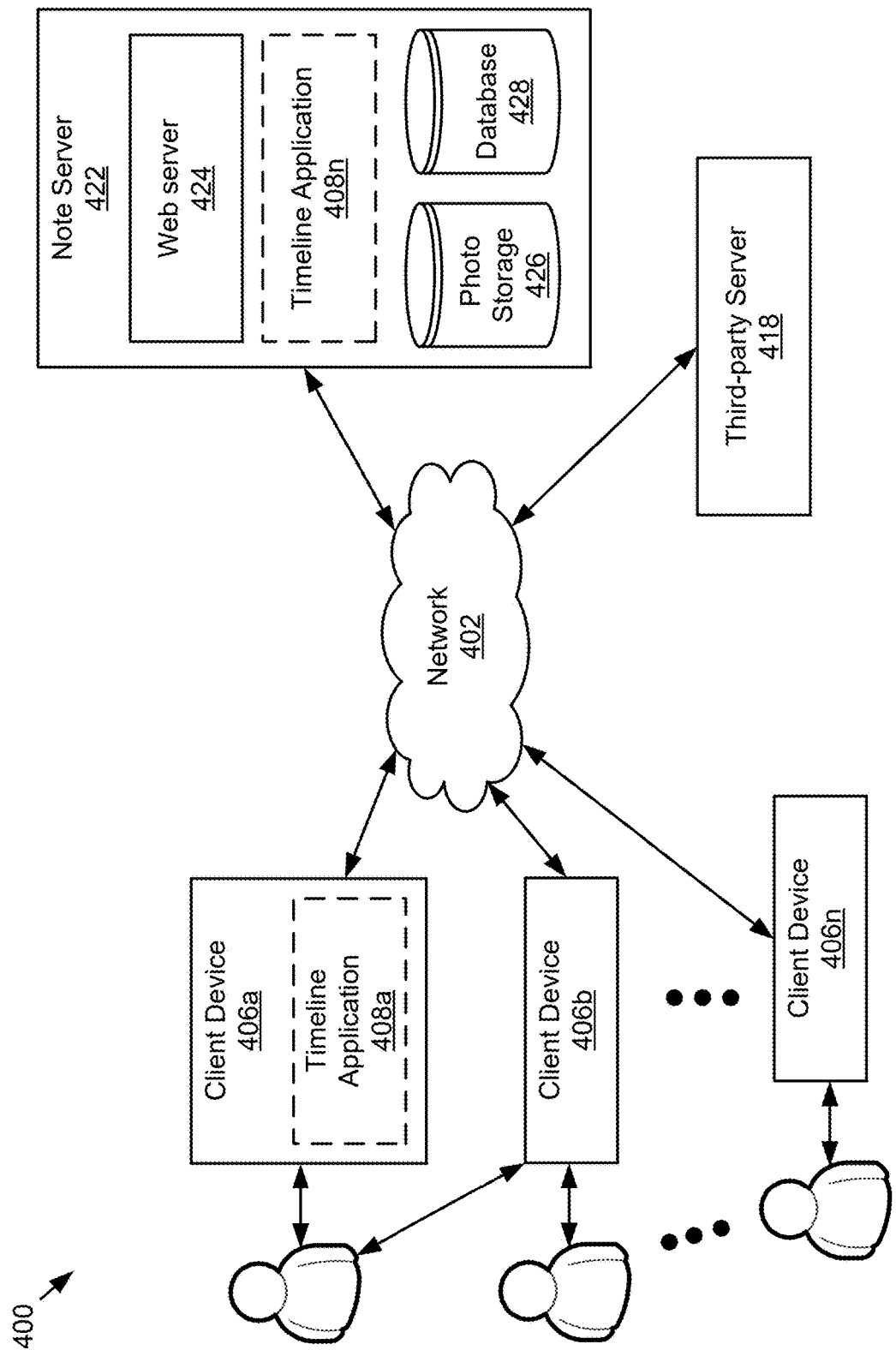
FIG. 4 is a block diagram of an example system for providing a mobile graphical user interface for marking and organizing images.

FIG. 4 is a block diagram of an example system 400 for providing a mobile GUI for marking and organizing images. The architecture illustrated in FIG. 4 allows the data to be accessed or stored, for instance, in either a mobile application or web portal described above.

The illustrated system 400 may include a client device 406a . . . 406n (also referred to herein individually and/or collectively as 406), a third-party server 418, and an note server 422, which are electronically communicatively coupled via a network 402 for interaction with one another, although other system configurations are possible including other devices, systems, and networks. For example, the system 400 could include any number of client devices 406, third-party servers 418, note servers 422, and other systems and devices. The client devices 406a . . . 406n, and their components, may be coupled to the network 402. The note server 422 and its components may be coupled to the network 402. The third-party server 418 and its components may be coupled to the network 402.

The network 402 may include any number of networks and/or network types. For example, the network 402 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

A plurality of client devices 406a . . . 406n are depicted in FIG. 4 to indicate that the note server 422 and its components may provide services to a multiplicity of users on a multiplicity of client devices 406a . . . 406n. In some implementations, a single user may use more than one client device 406.

The note server 422 and the third-party server 418 have data processing, storing, and communication capabilities, as discussed elsewhere herein. For example, the servers 422 and/or 418 may include one or more hardware servers, server arrays, storage devices and/or systems, etc. In some implementations, the servers 422 and/or 418 may include one or more virtual servers, which operate in a host server environment. As depicted, the note server 422 may include the timeline application 408 and the web server 424, as discussed elsewhere herein.

In some implementations, multiple users may add information to the same timeline via separate instances of the application. For instance, one user may be responsible for equipment while another user is responsible for breakroom supplies. Accordingly, as items are identified using different categories, they may be combined into a single timeline or assessment. For example, multiple instances of the application may be communicatively coupled to exchange information.

The third-party server 418 can host services such as a third-party application (not shown), which may be individual and/or incorporated into the services provided by the note server 422. In some implementations, the third-party application may provide additional acts and/or information such as product data, audio transcription services, etc., to the note server 422.

It should be understood that the system 400 illustrated in FIG. 4 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer devices, services, and/or networks, and may implement various functionality client or server-side. Further, various entities of the system may be integrated into a single computing device or system or divided into additional computing devices or systems, etc.

The client devices 406 may also store and/or operate other software such as a timeline application 408 (also referred to herein as the "application"), other applications, etc., that are configured to interact with the note server 422 via the network 402.

The client device 406 includes one or more computing devices having data processing and communication capabilities. The client device 406 may couple to and communicate with other client devices 406 and the other entities of the system 400 via the network 402 using a wireless and/or wired connection. Examples of client devices 406 may include mobile phones, tablets, laptops, desktops, netbooks, server appliances, servers, virtual machines, TVs, voice-activated search devices or assistants, etc. The system 400 may include any number of client devices 406, including client devices of the same or different type.

The web server 424 includes computer logic executable by the processor 3708 to receive, process, and respond to content requests. The web server 424 may include an HTTP server, a REST (representational state transfer) service, or other suitable server type. The web server 424 may receive content requests (e.g., page requests, order requests, other requests (e.g., HTTP), etc.) from client devices 406, cooperate with the timeline application 408 to determine the content, retrieve and incorporate data from the database(s) 520, format the content, and provide the content to the client devices. In some instances, the web server 424 may format the content using a web language and provide the content to a corresponding timeline application 408 for processing and/or providing to the user for display, although other variations are also possible.

The web server 424 may be coupled to the database(s) 520 to store retrieve, and/or manipulate data stored therein and may be coupled to the timeline application 408 to facilitate its operations. For example, the web server 424 may allow a user on a client device 406 to communicate with the timeline application 408.

The timeline application 408 includes computer logic executable by the processor 508 on a client device 406 to provide for user interaction, receive user input, present information to the user via a display, and send data to and receive data from the other entities of the system 400 via the network 402. The timeline application 408 includes computer logic executable by the processor 508 to operations discussed elsewhere herein. Example interfaces that can be displayed by the timeline application 408 are shown, for example, in FIG. 2 or 6-52.

The web server 424, and/or the timeline application 408 may require the user to authenticate using known web authentication protocols in order to determine if they have permission to use the timeline application 408, as discussed further herein.

In a distributed model, the instance of the timeline application 408 configured to handle client-side operations may, in cooperation with the timeline application 408 being used by the user, generate and transmit the cart request via a computer network, such as the computer network 402 depicted in FIG. 4, to the note server 422. The web server 424 may receive, process, and respond to the cart request in cooperation with the server-side instance of the timeline application 408, as discussed elsewhere herein. For instance, the web server 424 may parse the cart request for information about the items in the cart and/or the user submitting the request and relay that information to and/or store the information for retrieval by the timeline application 408. In further embodiments, the timeline application 408 residing on the note server 422 may perform these acts using data stored on the note server 422, the client device 406, and/or another device of the system 400, such as the third-party server 418.

The photo storage 426 may include a data storage device in which photographs may be stored. The database 428 may include a data storage device in which textual data, assessment data, annotations, etc., may be stored. For example, a data storage device is described in reference to the database (s) 520.

Figure 5:
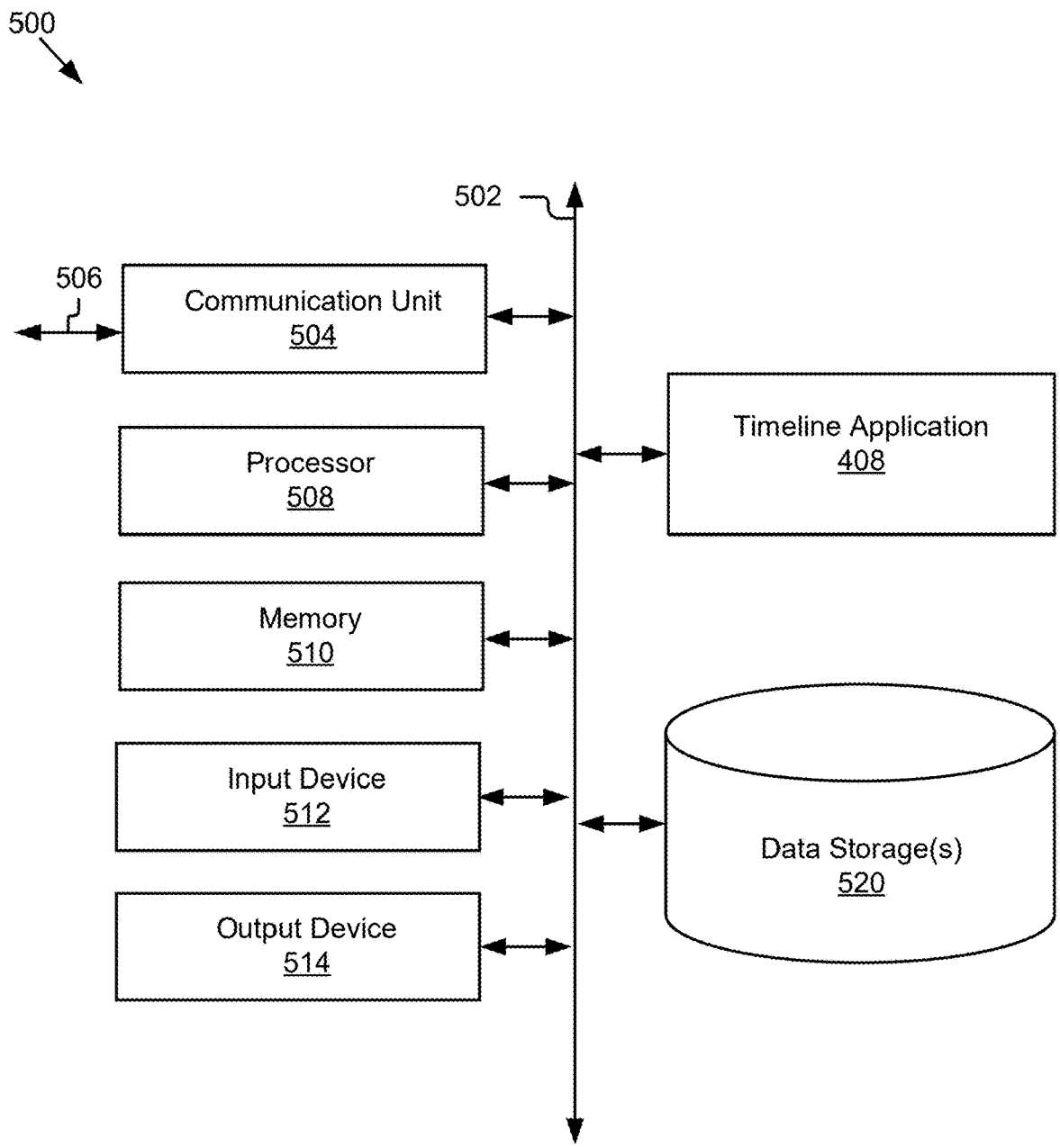
FIG. 5 is a block diagram of an example computing device.

An example computing system 500 of the technology is depicted in FIG. 5. This computing system 500 may represent the computer architecture of a client device 406, a third-party server 418, and/or a note server 422, as depicted in FIG. 4, and may include different components depending on the implementation being represented.

As depicted in FIG. 5, the computing system 500 may include a timeline application 408, depending on the configuration, although it should be understood that other configurations are also possible. The note server 422 may also include the web server 424 and/or components thereof, although other configurations are also possible and contemplated.

As depicted, the computing system 500 may include a processor 508, a memory 510, a communication unit 504, an output device 514, an input device 512, and database(s) 520, which may be communicatively coupled by a communication bus 502. The computing system 500 depicted in FIG. 5 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 500 may include various operating systems, sensors, additional processors, and other physical configurations. Although, for purposes of clarity, FIG. 5 only shows a single processor 508, memory 510, communication unit 504, etc., it should be understood that the computing system 500 may include a plurality of one or more of these components.

The processor 508 may execute software instructions by performing various input, logical, and/or mathematical operations. The processor 508 may have various computing architectures to method data signals including, for example, a complex instruction set computer (CISC) architecture, a reduced instruction set computer (RISC) architecture, and/or an architecture implementing a combination of instruction sets. The processor 508 may be physical and/or virtual, and may include a single core or plurality of processing units and/or cores. In some implementations, the processor 508 may be capable of generating and providing electronic display signals to a display device, supporting the display of images, capturing and transmitting images, performing complex tasks including various types of feature extraction and sampling, etc. In some implementations, the processor 508 may be coupled to the memory 510 via the bus 502 to access data and instructions therefrom and store data therein. The bus 502 may couple the processor 508 to the other components of the computing system 500 including, for example, the memory 510, the communication unit 504, the input device 512, the output device 514, and the database(s) 520.

The memory 510 may store and provide access to data to the other components of the computing system 500. The memory 510 may be included in a single computing device or a plurality of computing devices. In some implementations, the memory 510 may store instructions and/or data that may be executed by the processor 508. For example, the memory 510 may store one or more of a web server 424, a timeline application 408, a timeline application 408, and their respective components, depending on the configuration. The memory 510 is also capable of storing other instructions and data, including, for example, an operating system, hardware drivers, other software applications, databases, etc. The memory 510 may be coupled to the bus 502 for communication with the processor 508 and the other components of computing system 500.

The memory 510 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 508. In some implementations, the memory 510 may include one or more of volatile memory and non-volatile memory (e.g., RAM, ROM, hard disk, optical disk, etc.). It should be understood that the memory 510 may be a single device or may include multiple types of devices and configurations.

The bus 502 can include a communication bus for transferring data between components of a computing device or between computing devices, a network bus system including the network 402 or portions thereof, a processor mesh, a combination thereof, etc. In some implementations, the web server 424, timeline application 408, or various other components operating on the computing device 500 (operating systems, device drivers, etc.) may cooperate and communicate via a communication mechanism included in or implemented in association with the bus 502. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 504 may include one or more interface devices (I/F) for wired and wireless connectivity among the components of the system 400. For instance, the communication unit 504 may include various types known connectivity and interface options. The communication unit 504 may be coupled to the other components of the computing system 500 via the bus 502. The communication unit 504 may be electronically communicatively coupled to the network 402 (e.g., wiredly, wirelessly, etc.), for example, as illustrated by the line 506. In some implementations, the communication unit 504 can link the processor 508 to the network 402, which may in turn be coupled to other processing systems. The communication unit 504 can provide other connections to the network 402 and to other entities of the system 400 using various communication protocols.

The input device 512 may include any device for inputting information into the computing system 500. In some implementations, the input device 512 may include one or more peripheral devices. For example, the input device 512 may include a keyboard, a pointing device, microphone, an image/video capture device (e.g., camera), a touch-screen display integrated with the output device 514, etc.

The output device 514 may be any device capable of outputting information from the computing system 500. The output device 514 may include one or more of a display (LCD, OLED, etc.), a printer, a 3D printer, a haptic device, audio reproduction device, touch-screen display, etc. In some implementations, the output device is a display which may display electronic images and data output by the computing system 500 for presentation to a user. In some implementations, the computing system 500 may include a graphics adapter (not shown) for providing and outputting the images and data for presentation on output device 514. The graphics adapter (not shown) may be a separate processing device including a separate processor and memory (not shown) or may be integrated with the processor 508 and memory 510.

The database(s) 520 are information source(s) for storing and providing access to data. The data stored by the database(s) 520 may organized and queried using various criteria including any type of data stored by them, such as a category, flag, annotation type, etc. The database(s) 520 may include file systems, data tables, documents, databases, or other organized collections of data.

The components of the computing system 500, may be communicatively coupled by the bus 502 and/or the processor 508 to one another. In some implementations, the components 424 and/or 408 may include computer logic (e.g., software logic, hardware logic, etc.) executable by the processor 508 to provide their acts and/or functionality. In any of the foregoing implementations, these components 424 and/or 408 may be adapted for cooperation and communication with the processor 508 and the other components of the computing system 500.

The database(s) 520 may be included in the computing system 500 or in another computing system and/or storage system distinct from but coupled to or accessible by the computing system 500. The database(s) 520 can include one or more non-transitory computer-readable mediums for storing the data. In some implementations, the database(s) 520 may be incorporated with the memory 510 or may be distinct therefrom. In some implementations, the database(s) 520 may store data associated with a database management system (DBMS) operable on the computing system 500. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects may not be mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims. Additionally, the disclosure is in no way limited to implementation in any specific programming language, or for any specific operating system or environment.

What is claimed is:

1. A computer-implemented method comprising:
   presenting, by a processor, on a display device of a wireless mobile electronic device, a graphical user interface including:
      an image region that displays a capturable image that is capturable by an image sensor of the wireless mobile electronic device;
      a preview region including a set of image previews, a first image preview of the set of image previews representing a first image in the set of image previews; and
      a first input element displayed overlayed over the image region to capture the capturable image;
   receiving, by the processor, an input using an input device of the wireless mobile electronic device, the input including a selection of the first input element to capture the capturable image; and
   updating, by the processor, the graphical user interface to represent the captured image at the preview region on the graphical user interface.

2. The computer-implemented method of claim 1, wherein:
   the preview region displays row of the set of image previews aligned on the graphical user interface, an assessment of a physical location including the set of image previews.

3. The computer-implemented method of claim 1, further comprising:
   receiving, by the processor, an input including an annotation for the captured image; and
   displaying a graphical element representing the annotation in the preview region of the graphical user interface.

4. The computer-implemented method of claim 3, wherein displaying the graphical element representing the annotation in the preview region of the graphical user interface includes:
   overlaying the graphical element representing the annotation over an image preview of the captured image in the preview region.

5. The computer-implemented method of claim 4, further comprising:
   displaying a graphical representation of a grouping of a subset of the set of image previews in the preview region.

6. The computer-implemented method of claim 1, further comprising:
   responsive to receiving the input including the selection of the first input element, displaying one or more graphical annotation elements; and
   responsive to receiving an input selecting the one or more graphical annotation elements, generating one or more annotations in association with the captured image.

7. The computer-implemented method of claim 6, wherein:
   each graphical annotation element of the one or more graphical annotation elements is associated with one of a plurality of types of annotation.

8. The computer-implemented method of claim 7, wherein:
a graphical representation of each of the one or more annotations indicates a type of the annotation in the preview region.

9. The computer-implemented method of claim 6, wherein:
the one or more graphical annotation elements replace the first input element in the graphical user interface based on the selection of the first input element.

10. The computer-implemented method of claim 1, wherein:
the first input element is displayed at a first location on the graphical user interface; and
responsive to receiving the input including the selection of the first input element, one or more graphical annotation elements are displayed in the graphical user interface at one or more second locations, the one or more second locations being located radially from the first location on the graphical user interface.

11. The computer-implemented method of claim 1, further comprising:
associating one or more safety issue flags with the captured image based on a user input in the graphical user interface, the graphical user interface being displayed on a first client device; and
providing a second graphical user interface on a second client device, the second graphical user interface indicating the one or more safety issue flags.

12. A system comprising:
one or more processors; and
a computer-readable memory storing instructions that, when executed, cause the system to perform operations comprising:
presenting, on a display device of a wireless mobile electronic device, a graphical user interface including:
an image region that displays a capturable image that is capturable by an image sensor of the wireless mobile electronic device;
a preview region including a set of image previews, a first image preview of the set of image previews representing a first image in the set of image previews; and
a first input element displayed overlayed over the image region to capture the capturable image;
receiving an input using an input device of the wireless mobile electronic device, the input including a selection of the first input element to capture the capturable image; and
updating the graphical user interface to represent the captured image at the preview region on the graphical user interface.

13. The system of claim 12, wherein:
the preview region displays row of the set of image previews aligned on the graphical user interface, an assessment of a physical location including the set of image previews.

14. The system of claim 12, wherein the operations further comprise:
receiving an input using the input device of the wireless mobile electronic device, the input indicating an annotation for the captured image; and
displaying a graphical element representing the annotation in the preview region of the graphical user interface.

15. The system of claim 14, wherein displaying the graphical element representing the annotation in the preview region of the graphical user interface includes:
overlaying the graphical element representing the annotation over an image preview of the captured image in the preview region.

16. The system of claim 15, wherein the operations further comprise:
displaying a graphical representation of a grouping of a subset of the set of image previews in the preview region.

17. The system of claim 12, wherein the operations further comprise:
responsive to receiving the input including the selection of the first input element, displaying one or more graphical annotation elements; and
responsive to receiving an input selecting the one or more graphical annotation elements, generating one or more annotations in association with the captured image.

18. The system of claim 17, wherein:
each graphical annotation element of the one or more graphical annotation elements is associated with one of a plurality of types of annotation; and
a graphical representation of each of the one or more annotations indicates a type of the annotation in the preview region.

19. The system of claim 17, wherein:
the one or more graphical annotation elements replace the first input element in the graphical user interface based on the selection of the first input element.

20. The system of claim 12, wherein:
the first input element is displayed at a first location on the graphical user interface; and
responsive to receiving the input including the selection of the first input element, one or more graphical annotation elements are displayed in the graphical user interface at one or more second locations, the one or more second locations being located radially from the first location on the graphical user interface.

* * * * *